United States Patent
Raj et al.

(10) Patent No.: US 12,164,444 B2
(45) Date of Patent: Dec. 10, 2024

(54) DEVICE, METHOD, AND SYSTEM TO IDENTIFY A PAGE REQUEST TO BE PROCESSED AFTER A RESET EVENT

(71) Applicant: Intel Corporation, Santa Clara, CA (US)

(72) Inventors: Ashok Raj, Portland, OR (US); Rajesh Sankaran, Portland, OR (US); Rupin Vakharwala, Hillsboro, OR (US); Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 17/357,829

(22) Filed: Jun. 24, 2021

(65) Prior Publication Data
US 2022/0414029 A1  Dec. 29, 2022

(51) Int. Cl.
*G06F 13/16* (2006.01)
*G06F 13/42* (2006.01)
*G06F 9/455* (2018.01)

(52) U.S. Cl.
CPC ...... *G06F 13/1642* (2013.01); *G06F 13/4282* (2013.01); *G06F 9/45558* (2013.01);
(Continued)

(58) Field of Classification Search
CPC ............. G06F 13/1642; G06F 13/4282; G06F 9/45558; G06F 2009/45583; G06F 2213/0026
See application file for complete search history.

(56) References Cited

U.S. PATENT DOCUMENTS

2007/0038840 A1*  2/2007  Hummel ............. G06F 12/1027
                                              711/E12.067
2015/0100818 A1*  4/2015  Kegel ................. G06F 12/1081
                                              714/5.1
(Continued)

FOREIGN PATENT DOCUMENTS

WO  2019132976  7/2019
WO  2020124519  6/2020

OTHER PUBLICATIONS

"Intel Virtualization Technology for Directed I/O (VT-d): Enhancing Intel platforms for efficient virtualization of I/O devices", <https://software.intel.com/content/www/us/en/develop/articles/intel-virtualization-technology-for-directed-io-vt-d-enhancing-intel-platforms-for-efficient-virtualization-of-io-devices.html> Mar. 6, 2012, 10 pgs.

(Continued)

*Primary Examiner* — Henry Tsai
*Assistant Examiner* — Harry Z Wang
(74) *Attorney, Agent, or Firm* — Essential Patents Group, LLP

(57) ABSTRACT

Techniques and mechanisms for an input-output memory management module (IOMMU) to indicate to software whether a page request by an endpoint device is to be serviced. In an embodiment, the IOMMU receives from the endpoint device a response to an invalidation wait message. Based on the response, the IOMMU provides first information which indicates to software that page requests have been flushed from the endpoint device. Page request message from the endpoint device are compatible with an interface standard which also comprises a stop marker message type. The first information is provided independent of the endpoint device providing any message which is of the stop marker message type. In another embodiment, the (Continued)

first information includes a drain marker generated by the IOMMU, or a snapshot of an address corresponding to an end of a page request queue.

20 Claims, 19 Drawing Sheets

(52) U.S. Cl.
CPC ............. *G06F 2009/45583* (2013.01); *G06F 2213/0026* (2013.01)

(56) References Cited

U.S. PATENT DOCUMENTS

| | | |
|---|---|---|
| 2016/0077946 A1* | 3/2016 | Raikin ................ G06F 12/1009 710/14 |
| 2017/0177499 A1* | 6/2017 | Guthrie ............... G06F 12/1027 |
| 2019/0205278 A1* | 7/2019 | Panian ................ G06F 12/0833 |
| 2019/0347125 A1 | 11/2019 | Sankaran et al. |
| 2020/0226091 A1* | 7/2020 | Harriman ........... G06F 13/4282 |
| 2021/0004334 A1 | 1/2021 | Tian et al. |
| 2021/0064525 A1 | 3/2021 | Tian et al. |

OTHER PUBLICATIONS

"Intel Virtualization Technology for Directed I/O Architecture Specification", <https://software.intel.com/content/www/us/en/develop/download/intel-virtualization-technology-for-directed-io-architecture-specification.html> Apr. 16, 2020, 2 pgs.

* cited by examiner

FIG. 3A

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | 0 | 1 | \multicolumn{5}{l}{Type 10000} | T9 | | | TC | | | T8 | Attr | | R | TD | EP | | Attr | | | R | | \multicolumn{8}{l}{Length(0)} |
| \multicolumn{16}{l}{Requester ID} | \multicolumn{8}{l}{Tag} | \multicolumn{8}{l}{Message Code (0000 0100b)} |
| \multicolumn{32}{l}{Page Address [63:32]} |
| \multicolumn{20}{l}{Page Address [31:12]} | \multicolumn{9}{l}{Page Request Group Index} | L | W | R |

| 127-76 | 75-65 | 64 |
|---|---|---|
| Address [63:12] | | |

| 63-52 | 51-48 | 47-32 | 31-21 | 20-16 | 15-12 | 11-9 | 8-4 | 3-0 |
|---|---|---|---|---|---|---|---|---|
| PFSID[15:4] | | SID | | MIP | PFSID[3:0] | Type[6:4] | | Type[3:0] |

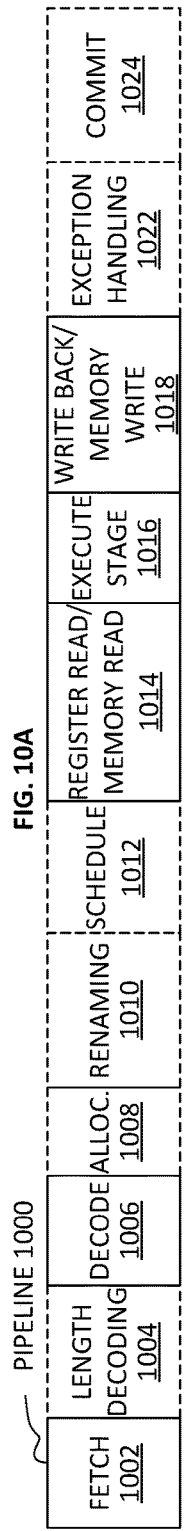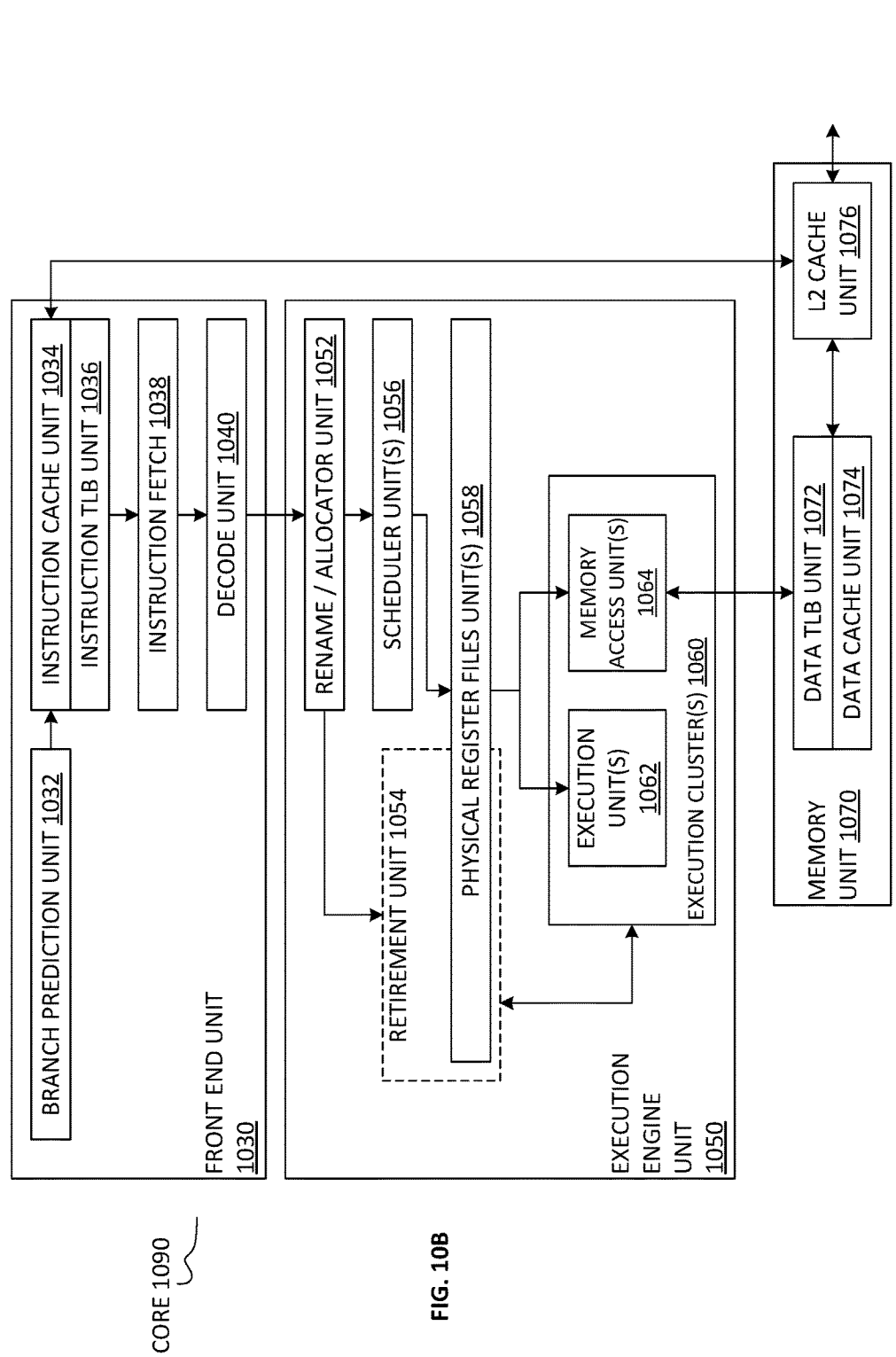

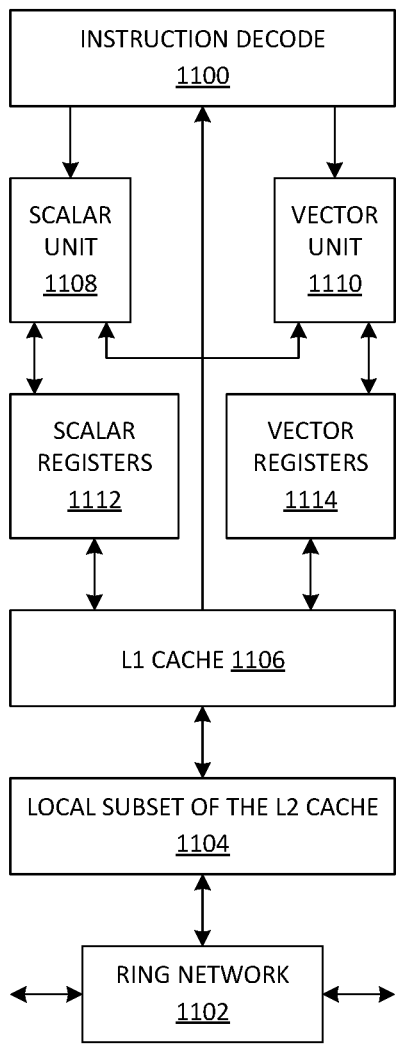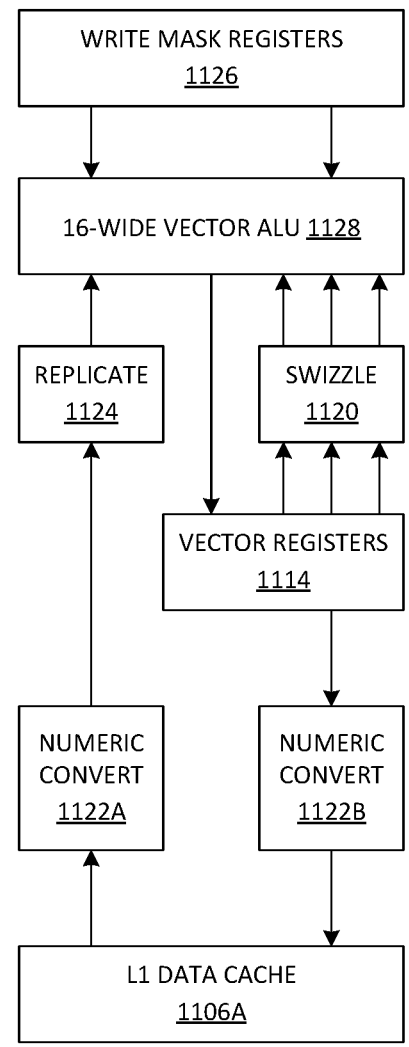
FIG. 11A
FIG. 11B

DEVICE, METHOD, AND SYSTEM TO IDENTIFY A PAGE REQUEST TO BE PROCESSED AFTER A RESET EVENT

BACKGROUND

1. Technical Field

This disclosure generally relates to operations of an input-output memory management module and more particularly, but not exclusively, to operations which facilitate virtualization within microprocessors.

2. Background Art

Computers and other information processing systems include one or more subsystems or components, such as input/output (I/O) devices, that independently access a system memory, for example, using direct memory access (DMA) transactions and/or be accessed by one or more processors. Various system capabilities, such as virtualization, result in different views of system memory for different I/O devices. Virtualization allows multiple instances of an operating system (OS) to run on a single system platform. Virtualization is implemented by using software, such as a virtual machine monitor (VMM) or hypervisor, to present to each OS a "guest" or virtual machine (VM). The VM is a portion of software that, when executed on appropriate hardware, creates an environment allowing for the abstraction of an actual physical computer system also referred to as a "host" or "host machine." On the host machine, the virtual machine monitor provides a variety of functions for the VMs, such as allocating and executing request by the virtual machines for the various resources of the host machine. Therefore, various address translation techniques for virtualization of I/O devices have been developed.

BRIEF DESCRIPTION OF THE DRAWINGS

The various embodiments of the present invention are illustrated by way of example, and not by way of limitation, in the figures of the accompanying drawings and in which:

FIGS. 3A through 3D show data layout diagrams each illustrating features of a respective message to be communicated with an IOMMU according to a corresponding embodiment.

FIG. 10A is a block diagram illustrating both an exemplary in-order pipeline and an exemplary register renaming, out-of-order issue/execution pipeline according to an embodiment.

FIG. 10B is a block diagram illustrating both an exemplary embodiment of an in-order architecture core and an exemplary register renaming, out-of-order issue/execution architecture core to be included in a processor according to an embodiment.

FIGS. 11A through 11B illustrate a block diagram of a more specific exemplary in-order core architecture, which core would be one of several logic blocks (including other cores of the same type and/or different types) in a chip.

DETAILED DESCRIPTION

Figure 1A:
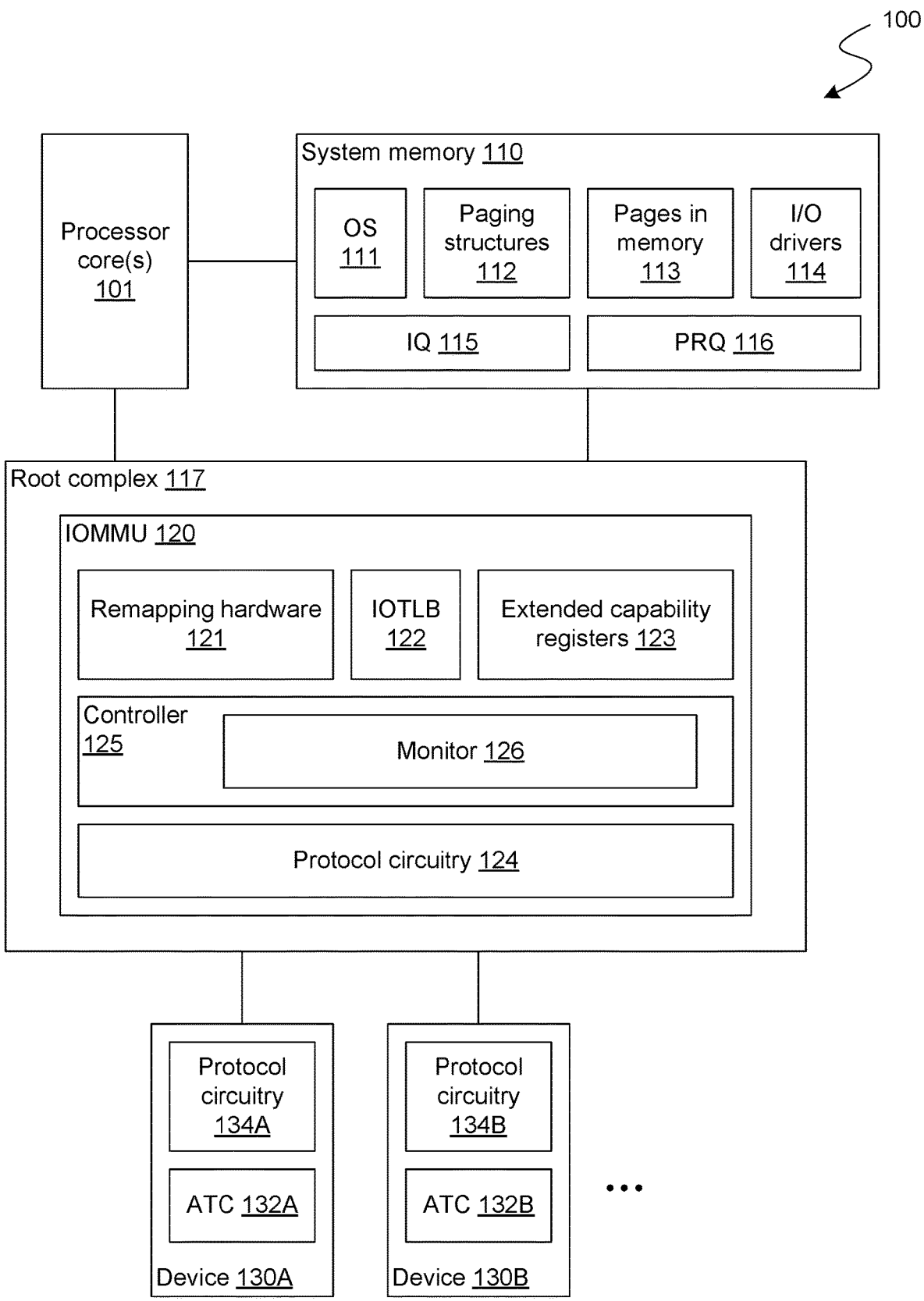
FIGS. 1A, 1B show functional block diagrams each illustrating respective features of a system to facilitate the resetting of an endpoint device according to an embodiment.

Embodiments discussed herein variously provide techniques and mechanisms for an input-output memory management module (IOMMU) to indicate to a software process whether a page request by an endpoint device is to be serviced. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including an IOMMU to facilitate communication with a processor core and an endpoint device.

Certain features of various embodiments are described herein with reference to an IOMMU which provides to a software process an indication as to whether a given page request from an endpoint device is to be processed (or alternatively, to be dropped). More particularly, the format of such a page request is variously described herein as being compatible with a page request message type which is identified in a Peripheral Component Interconnect Express (PCI-e®) specification, such as the PCI Express® Base Specification, Rev. 4.0 Version 1.0, published Sep. 27, 2017 by the Peripheral Component Interconnect Special Interest Group (PCI-SIG) of Beaverton, OR, USA. Furthermore, such an indication is variously described herein as being provided based on a wait message, the format of which is compatible with an invalidation wait descriptor which is identified in the Intel® Virtualization Technology for Directed I/O (VT-d) Architecture Specification, Rev. 3.3, published April, 2021 by Intel Corporation of Santa Clara, CA, USA. However, it is to be appreciated that such description can be extended for different embodiments wherein a format of a page request is compatible with any of various other suitable PCI-e (or other) interface standards, and/or wherein a format of a wait message is compatible with any of various other suitable VT-d (or other) virtualization standards.

Shared virtual memory (SVM) allows for fast accelerator input/output (I/O) devices (e.g., graphics and field programmable gate array (FPGA)) to be directly controlled by user space processes. In some embodiments, a process address space identifier (PASID or simply "ASID") is used in SVM-capable Peripheral Component Interconnect Express (PCI-e®) devices. For example, an I/O memory management unit (IOMMU) further uses the ASID information, which is embedded in a direct memory access (DMA) request out of the SVM-capable device, to assist address translation before forwarding the DMA request to memory controller. The IOMMU could support multiple translation tables (thus multiple address spaces) on a SVM-capable PCIE device. The translation tables are indexed by an ASID received in a direct memory access (DMA) request.

System software (e.g., Operation System or hypervisor) shares process CPU page tables with the IOMMU (each associated with an ASID) so that a virtual address (VA) can be used directly in the workload requests submitted to the device. Consequently the device tags an associated ASID to every DMA request which is generated when processing a submitted workload request. Upon receiving certain information (e.g., BDF (bus number, device number and function number), ASID, VA) in a DMA request, the IOMMU uses the BDF to locate device specific context entry, then an ASID for the ASID entry on that device, and then walks through shared CPU page table (pointed by ASID entry) to get physical address (PA). Finally, the VA received in a DMA request is translated to a PA by the IOMMU and then forwarded to a memory controller. With the introduction of SVM, applications are able to directly submit workloads to the device using CPU virtual address, which bypasses unnecessary overhead in kernel device driver and thus can greatly improve the performance.

For certain types of errors, an endpoint device will be reset by a corresponding driver process. For example, various PCIe-type single root I/O virtualization devices are reset by a Function Level Reset (FLR) operation which clears any error states to make the device operational. In many existing virtualization architectures, the execution of a FLR (or other suitable operation) to reset a device typically requires a "page drain" to assure that any outstanding page request messages from that device are provided to an IOMMU. Page drain functionality ensures that there is a clean cut-off point between any earlier still-pending page requests by the device (which are to be dropped), and subsequent page requests by the device, which are to be processed. This enables an operating system, hypervisor, virtual machine monitor (VMM) or other suitable software process to guarantee that there are no outstanding requests in the fabric before enabling the processing of page requests after a device reset.

Existing virtualization techniques variously rely upon an endpoint device sending a message of a standard message type (referred to herein as a "stop marker message type") to indicate—e.g., to the IOMMU—that all outstanding page requests ahead of the message have been pushed from the device in a strongly ordered manner. In various PCIe (or other) systems, such a stop marker message is to be delivered to a page request queue (PRQ) which is managed by the IOMMU. Such a PRQ is typically "global," insofar as there is only one PRQ to represent page requests for all the devices controlled by an IOMMU. Such a global PRQ is at risk of being filled when, for example, one or more of the supported devices send streaming requests. Given that a PCIe standard (for example) does not require a response to a stop marker message, the marker—in conventional systems—is at risk of being lost in a filled PRQ before being consumed by software.

To facilitate an efficient resumption of page requests processing after a device reset, some embodiments variously indicate the occurrence of a page flush without relying on the communication of a stop marker message by the device which is being reset. For example, some embodiments variously extend or otherwise adapt functionality of a VT-d (or other) virtualization standard to provide a mechanism—as an alternative to one provided by a PCIe (or other) interface standard—by which an IOMMU is to detect and/or communicate the completion of a page flush. In one such embodiment, said mechanism includes or is otherwise based on the communication of an invalidation wait message and/or a response to such an invalidation wait message.

Figure 1B:
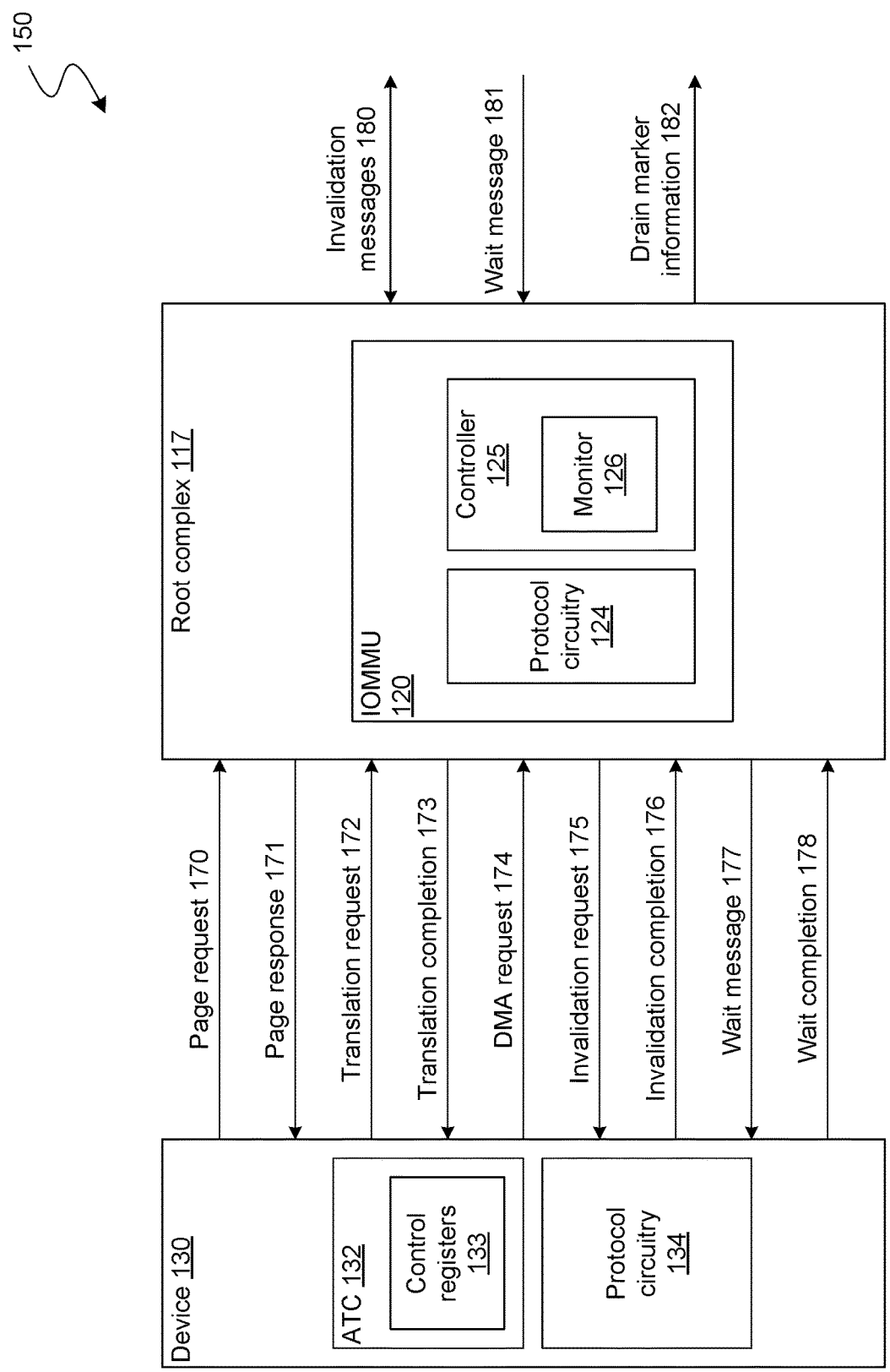

FIG. 1A shows features of a system 100 to facilitate page request processing after a device reset according to an embodiment. FIG. 1B shows various communications 150 which, in some embodiments are variously performed with system 100 (for example). System 100 illustrates one example of an embodiment wherein page requests by a device are compatible with an interface standard which includes a stop marker message type, wherein the completion of a page drain is indicated to software independent of the device providing any message of the stop marker message type.

As shown in FIG. 1A, system 100 comprises, among other components, one or more processor cores 101 that each execute a respective one or more operating systems (e.g., including the illustrative operating system OS 111 shown) and/or other software processes. The system 100 also comprises a system memory 110 to store any of various data and data structures including, for example, state of OS 111, paging structures 112, data pages 113, and I/O driver(s) 114, and/or the like.

The system 100 further comprises a root complex (RC) 117—for example, comprising a memory controller hub—which is coupled between the processor cores 101 and system memory 110 and one or more endpoint devices (e.g., including the illustrative devices 130A, 130B shown). In various embodiments, root complex 117 is integrated into a chipset that integrates multiple functionalities such as an ability to execute in isolated execution mode, a host-to-peripheral bus interface, memory control, and/or the like.

In one embodiment, the devices 130A, 130B, etc. comprise one or more integrated devices (such as processor graphics) and/or one or more discrete devices (such as PCIe™ devices or other attached devices. By way of illustration and not limitation, devices 130A, 130B, etc. comprise one or more of a network controller device, storage controller device, peripheral controller device (like Universal Serial Bus (USB) controllers), media controller device, display controller, or the like. In various embodiments, some or all of devices 130A, 130B, etc. variously support address translation functionality—e.g., wherein device 130A and device 130B comprises address translation caches ATC 132A, ATC 132B, respectively.

The root complex 117 also comprises an input/output memory management unit (IOMMU) 120 which provides one or more endpoint devices (e.g., including some or all of devices 130A, 130B, etc.) with an address translation service. As used herein, "input/output memory management unit" or "IOMMU" (which, alternatively, is often called a "system memory management unit," or "SMMU") refers to any of a variety of devices which support communications, with a main memory and one or more endpoint devices, to facilitate DMA functionality whereby the one or more endpoint devices are to variously access the main memory. In various embodiments, circuitry of an IOMMU maps a given address—e.g., including a virtual address which has been provided (or is to be provided) to one such endpoint device—to a physical address which corresponds to a location in a main memory.

For example, IOMMU 120 comprises remapping hardware 121 that is configured to facilitate address translation for direct memory access (DMA) or other transactions, an I/O translation lookaside buffer (IOTLB) 122, in which to cache transactions and corresponding data, and extended capability registers 123 used to report to software enablement of various remapping features. DMA functionality of system 100 is facilitated with an address remapping architecture which supports address translation of DMA requests received by the root complex 117 from the devices 130. In an embodiment, hardware of IOMMU 120 accelerates the address-translation process by caching data from various translation structures—e.g., wherein IOTLB 122 is coupled to the remapping hardware 121.

System 100 supports communications which comprise messages that are compatible with an interface standard—such as one defined in a PCIe specification (or other suitable specification)—which identifies or otherwise comprises a page request message type and a stop marker message type. The page request message type provides a format for page requests that, for example, are to be provided to an IOMMU, by an endpoint device, for enqueuing in a page request queue. The stop marker message type provides another format for messages (referred to herein as a "stop marker messages") that, for example, are also to be sent from an endpoint device to a page request queue via an IOMMU. According to the interface standard, a stop marker message is to indicate that the endpoint device in question has at least temporarily stopped the generation of page requests—e.g., wherein the stop marker message indicates the completion of a page flush wherein all page requests previously generated have been flushed from the endpoint device.

In various embodiments, communications supported by system 100 further comprise messages that are compatible with a virtualization standard—such as one defined in a VT-d specification, or other suitable specification—which identifies or otherwise comprises a type of message which is referred to herein as an "invalidation wait message type" (or simply "wait message type"). According to said virtualization standard, a message of the wait message type (a "wait message" herein) is provided—e.g., by a software process to an invalidation queue—to indicate that any invalidation indicated by a later entry in the invalidation queue is to be delayed until after a response to the wait message is detected.

To facilitate the processing of page requests by an endpoint device, some embodiments extend or otherwise adapt functionality of an invalidation wait message to indicate the completion of a page flush by a device—e.g., wherein a response to an invalidation wait message is to provide an alternative to the communication of a stop marker message by an endpoint device.

By way of illustration and not limitation, IOMMU 120 comprises protocol circuitry 124 to participate in communications with protocol circuitry 134A of device 130A, and/or communications with protocol circuitry 134B of device 130B. Protocol circuitry 124, protocol circuitry 134A, and protocol circuitry 134B each illustrate any of various state machines, microcontrollers, programmable gate arrays, or other suitable circuitry to support operations according to an interface standard, a virtualization standard, and/or the like.

An invalidation queue (IQ) 115 and a page request queue (PRQ 116) are provided by system 100 to facilitate communication between IOMMU 120 and OS 111 (or other suitable software)—e.g., wherein device 130A (for example) sends page requests to PRQ 116 via IOMMU 120, and/or wherein OS 111 sends invalidation information to IOMMU 120 via IQ 115.

FIG. 1B shows one example of communications 150 including messages by system 100 which facilitate page request processing after a device reset. Communications 150 illustrate one embodiment which facilitates (and/or extends or otherwise adapts) messages which are compatible with a conventional interface specification, and other messages which are compatible with a conventional virtualization specification. Some or all of communications 150 are facilitated by protocol circuitry 124 of IOMMU 120 and protocol circuitry 134 of device 130. Controller 125 of IOMMU 120 provides additional functionality, according to various embodiments, to avoid the need for a stop marker message to be communicated by an endpoint device.

In the example embodiment shown, communications 150 comprise first messages variously communicated between root complex 117 and an endpoint device 130 (e.g., one of devices 130A, 130B), and second messages which are variously communicated between root complex 117 and executing software such as OS 111. In various embodiments, such second messages include invalidation messages 180 including, for example, one or more invalidation request messages and/or one or more invalidation completion messages (such as the illustrative invalidation request 175 and invalidation completion 176 shown). In one such embodiment, the second messages further comprise an invalidation wait message 181 and a drain marker message 182 which (for example) is provided based on device 130 providing a response to said invalidation wait message 181.

In an embodiment, IOMMU 120 provides virtualization technology for directed I/O of the I/O device 130, according to an embodiment. The ATC 132 further includes control registers 133 to enable capabilities and ATC behavior such as address translation services and page request support. In one or more address translation service specifications, a memory request between the ATC 132 and the IOMMU 120 includes a transaction header with an "Address Type" (AT) field. This AT field indicates whether a transaction is a memory request with "Untranslated" address or a memory request with a "Translated" address. The specification also defines an ATC invalidation message.

Device 130 communicates with pages in memory 113 through root complex 117, and IOMMU 120 uses paging structures 112 to perform translations and (for example) to protect against unauthorized access to the pages in memory 113. In one instance, ATC 132 sends a page request 170 to root complex 117, to request a page from the pages in memory 113. This page request enables ATC 132 to report a page fault to IOMMU 120. In response, IOMMU 120 responds with a page response 171, to allow IOMMU 120 to send a page fault response after servicing a page fault.

In one embodiment, ATC 132 also sends a translation request 172 to IOMMU 120 with a virtual address (whether a guest virtual address (GVA) or an I/O virtual address (IOVA)) for access to a corresponding host physical address (HPA). IOMMU 120 then generates an address translation—e.g., based on a mapping between the GVA (or IOVA) and a guest physical address (GPA), and then a mapping between the GPA and the corresponding HPA—using various paging structures 112 (e.g., paging tables) and in relation to the pages 113 in memory. After IOMMU 120 completes address mapping in response to the translation request, IOMMU responds to ATC 132 with a translation completion message 173 which, for example, comprises the HPA (assuming successful translation) and translation data that device 130 uses to formulate a translated request. ATC 132 then sends a translated DMA request 174 (e.g., a regular memory read, write, or atomics request with an AT field and the HPA) to IOMMU 120 to obtain needed data stored at the HPA.

IOMMU 120 also sends to the ATC 132 of device 130 an invalidation request 175 to invalidate a translation cached in ATC 132, e.g., because the translation is stale or determined to be invalid for other reasons, such as in response to an invalidation request from software executed with the one or more cores 101. After the translation has been cleared from ATC 132, ATC 132 sends an invalidation completion message to root complex 117 (176).

The following more-detailed explanation is specific to the PCI-Express® Address Translation Services (ATS) specification and is given by way of example for explanatory purposes and for context throughout the remainder of this disclosure. Using the PCI-Express® ATS specification, however, is not meant to be limiting of the aspects of the disclosure that also apply to other types of I/O devices and protocols. In the following explanation, PASID stands for Process Address Space Identifier. Some DMA requests with a virtual address (or a guest virtual address) are tagged with a PASID value that identifies the targeted virtual address space.

Translation Request 172: Translation-requests-without-PASID specify the following attributes that are used by remapping hardware to process the request. Address Type (AT), where the AT field has value of 01b to identify it as a translation-request. Address, where an Address field indicates the starting input address for which the translation is requested. Length, where a Length field indicates how many sequential translations can be returned in response to this request. Each translation is 8 bytes in length. If the length field has a value greater than two, then the additional translations (if returned in the translation response) are for sequentially increasing equal-sized pages starting at the requested input address. No Write (NW) flag, that when set, indicates if the endpoint is requesting read-only access for this translation. Translation requests with PASID specify the same attributes as above, and also specify these additional attributes: PASID value, Execute-Requested (ER) flag, and Privileged-mode-Requested (PR) flag in the PASID prefix.

Translation Completion 173: If IOMMU 120 was not able to successfully process the translation request (with or without PASID), a translation completion without data is returned. A status code of UR (unsupported request) is returned in the translation completion if IOMMU 120 is configured to not support translation requests from this device 130. A status code of CR (completer abort) is returned in the translation completion if IOMMU 120 encountered errors when processing the translation request.

If the remapping hardware was able to successfully process a translation request, a translation completion with data is returned. For successful translation requests without PASID, each translation returned in the translation completion data specifies the following attributes. Size (S), where a value of 0b in Size field indicates the translation is for a 4-KByte page. If the Size field is 1b, the size of the translation is determined by the lowest bit in the translated address field (bits 63:12) with a value of 0. For example, if bit 12 is 0, the translation applies to an 8-KByte page. If bit 12 is 1 and bit 13 is 0, the translation applies to a 16-KByte page, and so on. Non-Snooped access flag (N) that, when set, the non-snooped access field indicates that the translated requests that use this translation must clear the No Snoop Attribute in the request. Untranslated access only flag (U) that, when set, the input address range for the translation can only be accessed by device 130 using the untranslated request. Read permission (R) that, when set, read permission is granted for the input address range of this translation. If R is clear, read permission is not granted for the input address range of this translation. Write permission (W) that, when set, write permission is granted for the input address range of this translation. If W is clear, write permission is not granted for the input address range of this translation. Translated Address that, when either the R or W field is set, and the U field is clear, the Translated Address field contains the result of the translation for the respective input address. Device 130 can access the page through translated requests with this address.

For successful translation requests with PASID, each translation returned in the translation completion data specifies the same attributes as above, along with following extended attributes: Execute permission (EXE), where if EXE=R=1, execute permission is granted for the input address range of this translation, else, execute permission is not granted for the input address range of this translation. Privilege Mode Access (PRIV), which when set, R, W and EXE refer to permissions associated with privileged mode access, requiring translated requests with PASID using this translation to set the privileged-mode-requested flag in the PASID TLP prefix. If PRIV is clear, R, W, and EXE refer to permissions associated with nonprivileged access, requiring translated-requests with PASID using this translation to clear the privileged-mode-requested flag in the PASID TLP prefix. Global Mapping (G) that, when set, the translation is common across all PASIDs at this device 130. If G is clear, the translation is specific to the PASID value specified in the PASID prefix in the associated translation request, without global impact.

Translated Request 174: Translated requests are regular memory read, write, or atomics requests with address type (AT) field value of 10b. When generating requests to a given input (untranslated) address, device 130 looks up the local ATC 132 for cached translation (result of previous translation requests) for the input address. If a cached translation is found with appropriate permissions and privilege, device 130 generates a translated request (AT=10b) specifying the translated address obtained from ATC lookup. Translated requests are usually without PASID in referencing a translated HPA, but as will be discussed, now are with PASID in referencing a translated GPA.

Invalidation Request & Completion 175, 176: Invalidation requests are issued by software through remapping hardware to invalidate translations cached at endpoint device-TLBs. Invalidation-requests-without-PASID specify the following attributes. Device ID is an identity of the device (bus/device/function) whose ATC 132 is the target of invalidation. Size (S), where a value of 0b in the Size field indicates the target of invalidation is a 4-KByte input address range. If Size field is 1b, the input address range to be invalidated is determined by the lowest bit in the Untranslated Address field (bits 63:12) with a value of 0. Untranslated Address specifies the base of the input (untranslated) address range to be invalidated.

The Invalidation Requests with PASID specify the same attributes as above, along with a global invalidate flag. If the global-invalidate flag is 1, the invalidation affects across all PASID values. If the global-invalidate flag is 0, the invalidation is required to affect only the PASID value specified in the PASID Transaction Layer Packet (TLP) prefix. Invalidation requests and completions carry additional tags (ITags) managed by hardware to uniquely identify invalidation requests and completions.

In the illustrative embodiment shown, controller 125 includes, is coupled to access, or otherwise operates based on circuitry of IOMMU 120—such as the illustrative monitor 126—which is coupled to snoop or otherwise detect messages variously received from a software process such as OS 111 (via IQ 115 or PRQ 116, for example) and/or messages variously received from device 130. Based on such detecting, IOMMU 120 sends drain marker information 182 to indicate to the software process whether a given page request indicated in PRQ 116 is to be processed (or alternatively, dropped). In an embodiment, the generation and communication of drain marker information 182 by IOMMU 120 is independent of whether device 130 has sent to IOMMU 120 a stop marker message.

For example, monitor 126 is configured to detect an invalidation wait message 181 which protocol circuitry 124 and/or controller 125 read from IQ 115 (or which is otherwise provided to IOMMU 120 by OS 111). Wait message 181 comprises one or more identifiers corresponding to device 130—e.g., the one or more identifiers including a process address space identifier (PASID), a physical function source identifier (PFSID), or a source identifier (SID). In one such embodiment, wait message 181 is sent from IOMMU 120 to device 130 as wait message 177—e.g., wherein monitor 126 subsequently snoops or otherwise detects for when a response to wait message 177 (such as the illustrative wait completion message 178 shown) is provided by device 130. For example, while monitor 126 snoops to detect messages from device 130, controller 125 keeps track of the one or more identifiers provided in invalidation wait message 181, and includes some or all such identifiers in drain marker information 182 based on the communication of wait completion message 178.

In various embodiments, drain marker information 182 is sent from IOMMU 120 to be enqueued in PRQ 116—e.g., wherein a first page request from device 130 was previously enqueued to PRQ 116, and a second page request from device 130 is subsequently enqueued to PRQ 116 after drain marker information 182. In one such embodiment, the enqueued drain marker information 182 indicates to OS 111 that the earlier first page request is to be dropped, and that the later second page request is to be processed. In one such embodiment, the first page request and the second page request are enqueued at a first entry and a second entry (respectively) of PRQ 116, wherein drain marker information 182 is enqueued to a third entry in PRQ 116 which is between the first entry and the second entry. For example, drain marker information 182 identifies the third entry as a delineation between a first region of PRQ 116 and a second region of PRQ 116 (including the first entry and second entry, respectively), wherein drain marker information 182 indicates that—with respect to page requests from device 130—the first region corresponds to page requests which are to be dropped, and that the second region corresponds to page requests which are to be processed.

In other embodiments, drain marker information 182 additionally or alternatively comprises an address, pointer or other value which identifies the current location of the end—or "tail"—of PRQ 116 (where "current" in this context refers to a time of the location being identified by device 130 based on monitor 126 detecting wait completion message 178). In one such embodiment, drain marker information 182 is written to a location (not shown) in system memory 110 which is identified by an address, pointer or other suitable value in wait message 181.

Figure 2:
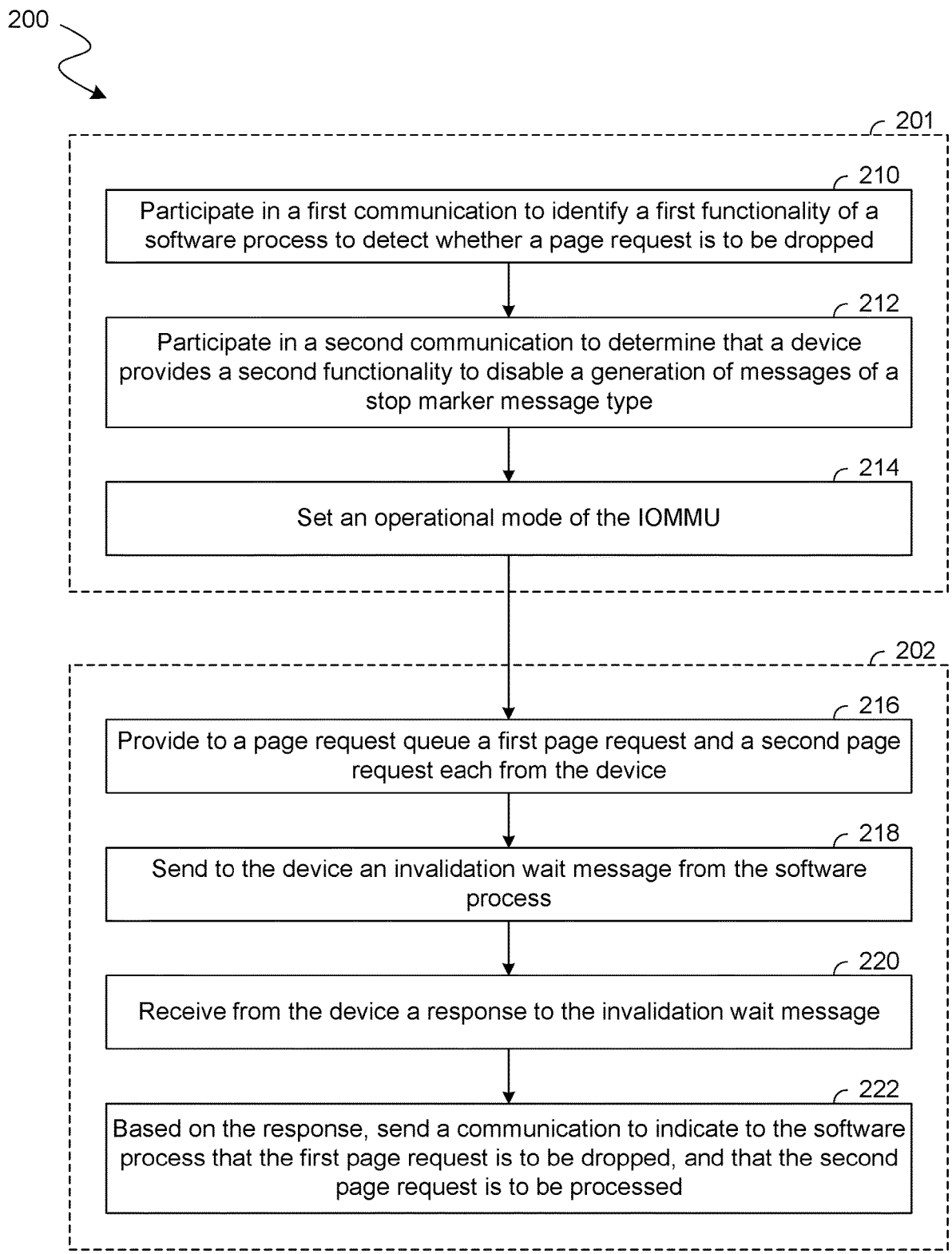
FIG. 2 shows a flow diagram illustrating features of a method to operate an IOMMU according to an embodiment.

FIG. 2 shows features of a method 200 performed at an IOMMU according to an embodiment. Method 200 illustrates one example of an embodiment wherein an IOMMU identifies an entry in a page request queue to facilitate processing of a page request which is compatible with an interface standard, wherein the identifying is independent of whether an endpoint has provided a stop marker message which is also compatible with the interface standard. Operations such as those of method 200 are performed with one or more components of system 100, for example.

Although some embodiments are not limited in this regard, method 200 includes or is otherwise based on operations 201 by an IOMMU to determine whether an endpoint device, and an OS (or other suitable process executed with a core of a processor) are able to support communications which comprise page requests which are compatible with an interface standard, but which do not require the communication of a stop marker message according to said interface standard.

By way of illustration and not limitation, operations 201 comprise (at 210) the IOMMU participating in a first communication—e.g., to access one or more capability registers, mode and/or other such resource—to identify a first functionality, of a software process, to detect whether a page request is to be dropped. In some embodiments, the first functionality enables the software process to retrieve, from a PRQ, information (referred to herein as a "drain marker") which has been provided independent of any stop marker message from an endpoint device. Alternatively or in addition, the first functionality enables the software process to access an identifier of a location in system memory which—at some earlier point in time—served as the entry at the end (or "tail") of a PRQ.

Operations 201 further comprise (at 212) the IOMMU participating in a second communication—e.g., with an endpoint device—to determine that the device provides a second functionality to disable a generation of messages of a stop marker message type. Based on the first communications and second communications, operations 201 set an operational mode of the IOMMU (at 214)—e.g., to provide an alternative to the use of stop marker messages according to the interface standard. In some embodiments, the IOMMU further signals the device to disable the generation of messages of the stop marker message type (and, for example, indicates to the software process that the that an particular type of messaging will be used as an alternative to stop marker messages)

Additionally or alternatively, method 200 comprises operations 202 which provide an indication as to whether a page request is to be processed (or alternatively, dropped). In some embodiments, some or all of operations 202 are based on the operational mode which is set at 214. In another embodiment, IOMMU is configured to support only one type of communication to indicate to whether a page request is to be processed or dropped.

In the example embodiment shown, operations 202 (at 216) provide to a page request queue a first page request and a second page request which the IOMMU variously receives—e.g., at different times—each from the same endpoint device. The first and second page requests are each compatible with an interface standard (such as that identified in a PCIe specification) which comprises the stop marker message type. According to the interface standard, a message which is of the stop marker message type is communicated by an endpoint device to indicate an at least temporary stoppage of page requests by that endpoint device.

Operations 202 further comprise (at 218) the IOMMU sending to the device an invalidation wait message from a software process which is executed by a processor. The wait message is compatible, for example, with a wait message type of a virtualization standard (such as one identified in a VT-d specification). In an embodiment, the wait message type is used—according to the virtualization standard—to indicate that one or more invalidations, which are currently specified each in a respective entry of an invalidation queue, are to be delayed until after a response to the wait message is detected.

Operations 202 further comprise (at 220) the IOMMU receiving from the endpoint device a response to the invalidation wait message—e.g., wherein the response indicates that a previously delayed processing of one or more invalidations indicated in the invalidation queue can now be performed. It is noted that the invalidation wait message is to be distinguished, for example, from any message which is according to the stop marker message type of the interface standard.

Based on the response received at 220, operations 202 send a communication (at 222) to indicate to the software process that the first page request is to be dropped, and that the second page request is to be processed. The IOMMU sends the communication at 222 independent of the device sending any earlier message of the stop marker message type.

In an illustrative scenario according to one embodiment, the first page request and the second page request are enqueued by the IOMMU to a first entry and a second entry (respectively) of the PRQ—e.g., wherein the communication sent at 222 provides information to a third PRQ entry which is between the first and second entries. In one such embodiment, the information—referred to herein as a "drain marker"—indicates to the software process that, with respect to page requests from the device, a first region of the PRQ which precedes the third entry (the first region including the first entry) corresponds to page requests which are to be dropped. Furthermore, with respect to page requests from the device, a second region of the PRQ which follows the third entry (the second region including the second entry) corresponds to page requests which are to be processed. In various embodiments, such drain marker information comprises one or more identifiers (for example, including a PASID, a SID, a PFSID and/or the like) which correspond to the device—e.g., wherein the one or more identifiers are provided based on their inclusion in the wait message received by the IOMMU.

In another embodiment, the communication sent at 222 includes a first identifier—e.g., an address, pointer or other suitable value—of where the current last (or "tail") entry of the PRQ is located in system memory. In one such embodiment, the wait message comprises a second identifier—e.g., a different address, pointer or other such value—of another location in system memory, wherein, based on the wait message, the communication sent at 222 stores the first identifier to the other location indicated by the second identifier.

FIGS. 3A through 3D shows features of respective messages which are variously provided, each according to a corresponding embodiment, to determine the selective processing of a page request. In various embodiments, message such as those represented in FIGS. 3A-3D are variously communicated by system 100—e.g., wherein one or more operations of method 200 include or are otherwise based on the communication of such messages.

FIG. 3A shows features of a page request message 300 which, for example, is sent from device 130 to IOMMU 120 for enqueuing in PRQ 116. Page request message 300 illustrates a format of a page request message type which, according to a PCIe specification (in this example embodiment), is used to report page requests received by remapping hardware such as that of an IOMMU. In an embodiment, 64 bits of page request message 300 comprise a standard PCIe message header, wherein the other 64 bits comprise fields which are specific to a page request. For example, page request message 300 comprises an untranslated address of a page that is requested, access permissions needed for accessing said page, and a page request group (PRG) index that, in some embodiments, facilitates the requesting of multiple pages.

FIG. 3B shows features of a Device-TLB invalidate descriptor 301 which, for example, is sent by OS 111 (or other suitable software process) to IQ 115. Invalidate descriptor 301 comprises a format of an invalidation message type which, according to a VT-d specification (in this example embodiment), enables software to invalidate cached mappings which have been available—e.g., using requests-without-PASID—to the Device-TLB on an endpoint device. In the example embodiment shown, invalidate descriptor 301 provides a physical function source identifier (PFSID), and a source identifier (SID), which are assigned to or otherwise associated with a corresponding endpoint device. Since translation requests-without-PASID from a device are serviced by hardware from the IOTLB, software is typically required to request IOTLB invalidation before requesting a corresponding device-TLB invalidation. The performance of an invalidation identified with invalidate descriptor 301 is subject to being at least temporarily delayed, for example, by an invalidation wait message that software further provides (for example) to an endpoint device via an IOMMU.

Figure 3C:
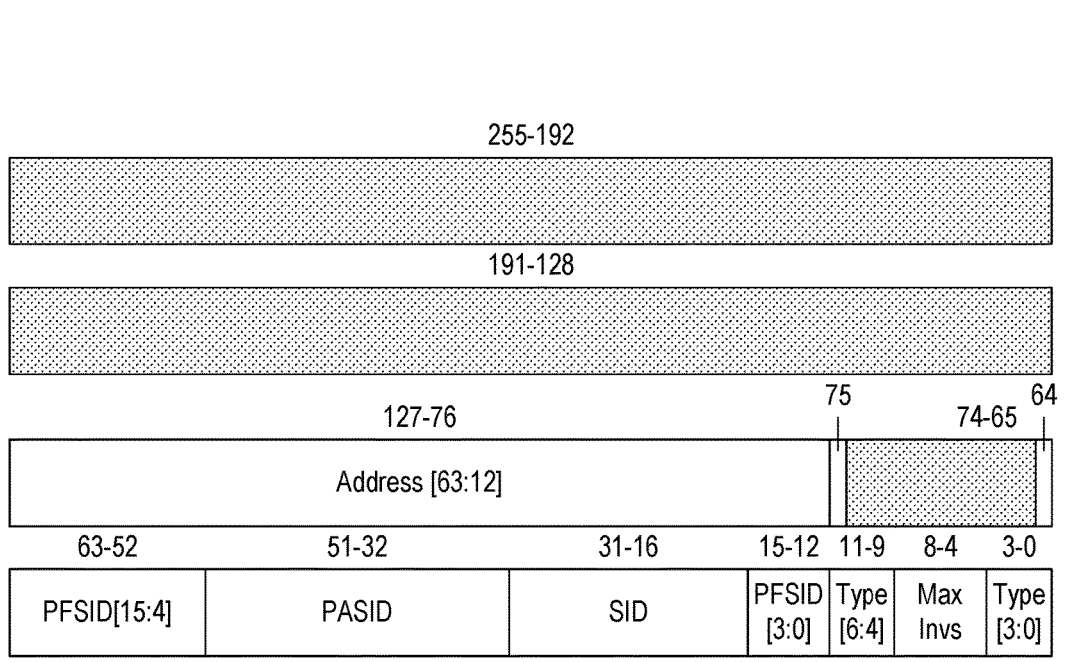

FIG. 3C shows features of a PASID-based invalidate descriptor 302 which is sent by a software process to an invalidation queue according to another embodiment. PASID-based invalidate descriptor 302 comprises a format of another invalidation message type which, according to a VT-d specification, enables software to invalidate cached mappings which have been available using requests-with-PASID. In the example embodiment shown, PASID-based invalidate descriptor 302 provides a PFSID, a PASID, and a SID, which are variously assigned to or otherwise associated with a corresponding endpoint device. Similar to Device-TLB invalidate descriptor 301, the performance of an invalidation identified with PASID-based invalidate descriptor 302 is subject to being at least temporarily delayed by an invalidation wait message.

Figure 3D:
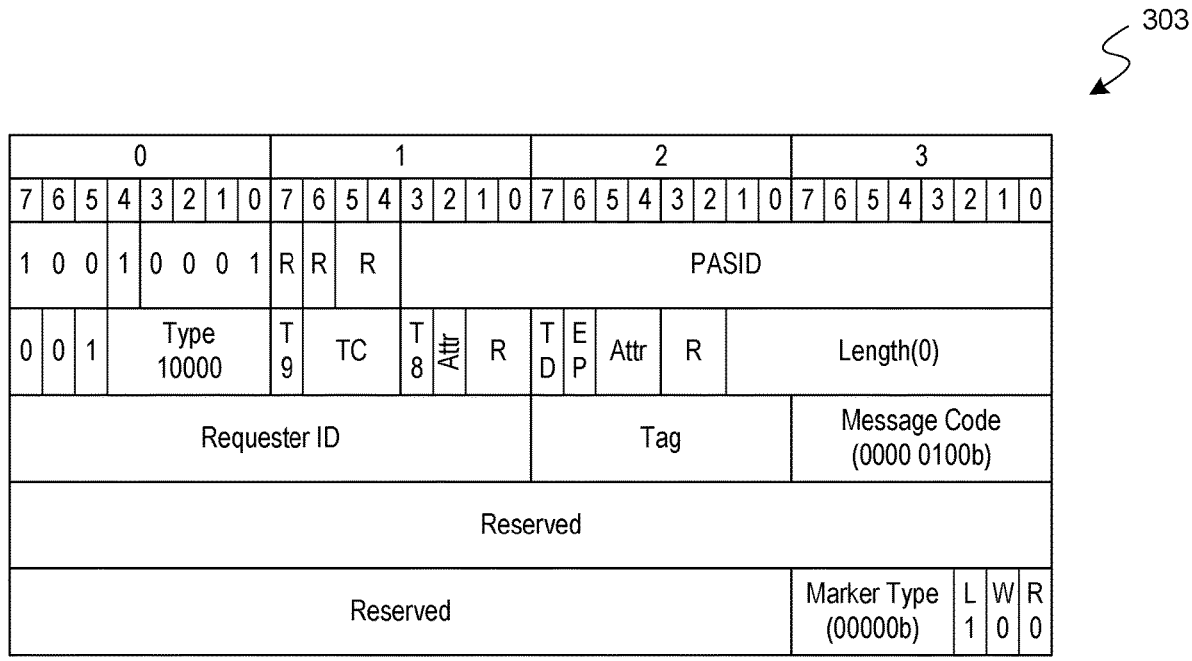

FIG. 3D shows a format of a stop marker message 303 which is compatible with the PCIe specification which also identifies a format of page request message 300. Some embodiments variously provide functionality wherein an IOMMU is operable to provide to a software process an indication that a page flush by an endpoint device has completed. Such an indication is provided, for example, independent of the endpoint device in question providing any earlier communication of such a stop marker message.

According to an interface standard, stop marker message 303 indicates that a function of an endpoint device has at least temporarily stopped using a page request interface, and has transmitted all pending page request messages for a specific PASID. For example, stop marker messages are strongly ordered with respect to page request messages, and serve to push page request messages toward a page request queue. A reading, dequeuing or otherwise receiving of a stop marker message indicates to an OS that all page request messages associated with the PASID being stopped have been delivered, and that any subsequent page request message with the same PASID value are associated with a new incarnation of that PASID value.

Figure 4A:
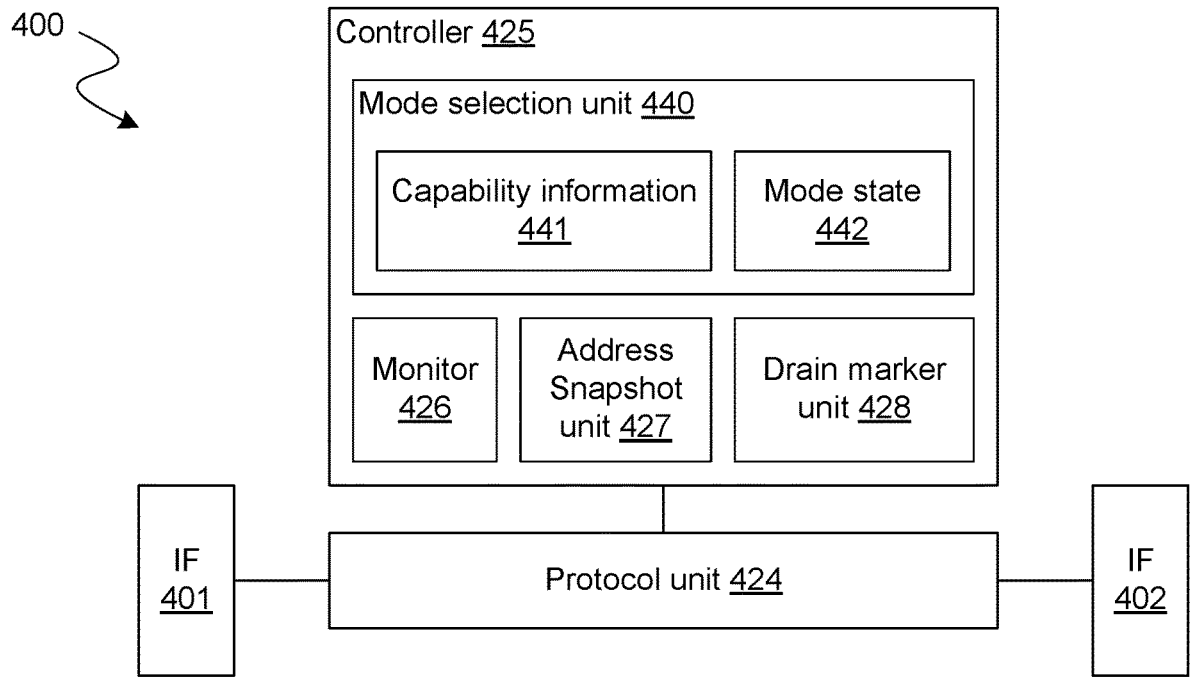
FIG. 4A shows a functional block diagram illustrating features of an IOMMU to indicate to a software process whether a page request is to be processed according to an embodiment.
Figure 4B:
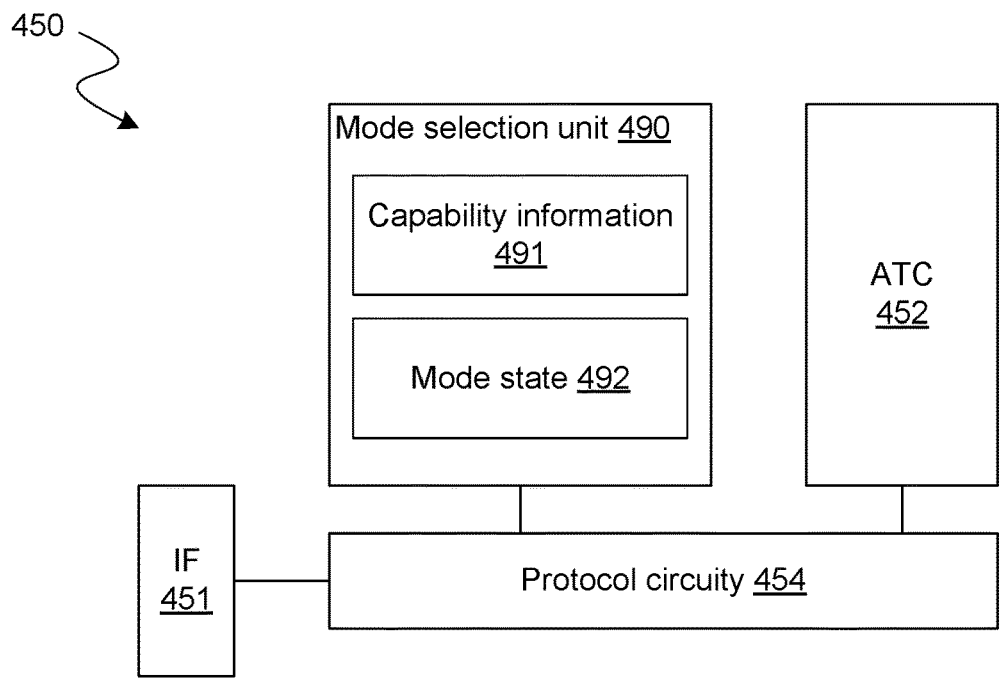
FIG. 4B shows a functional block diagram illustrating features of an endpoint device to provide page requests which are selectively processed according to an embodiment.

FIG. 4A shows features of an IOMMU 400 to indicate to a software process whether a page request is to be processed according to an embodiment. FIG. 4B shows features of an endpoint device 450 which (for example) supports operation with IOMMU 400 according to an embodiment. In various embodiments, IOMMU 400 and device 450 provides functionality of system—e.g., wherein such functionality supports one or more operations of method 200.

As shown in FIG. 4A, IOMMU 400 comprises a hardware interfaces IF 401, IF 402, a protocol unit 424 which is coupled between IF 401 and IF 402, and a controller 425 which is coupled to supplement or otherwise operate with functionality of protocol unit 424. Protocol unit 424 and controller 425 correspond functionally to protocol circuitry 124, controller 125 (respectively) in some embodiments—e.g., wherein a monitor 426 of controller 425 is to provide functionality of monitor 126. IF 401, and IF 402 comprise conductive contacts—e.g., including pins, pads, balls or other suitable conductor structures—and, in various embodiments, respective transmitters, receivers and/or other circuitry suitable to facilitate direct or indirect communicative coupling of IOMMU 400 to (respectively) one or more processor cores, and to an endpoint device. In one such embodiment, one of IF 401, or IF 402—or alternatively, an additional hardware interface of IOMMU 400—further enables coupling of IOMMU 400 to a system memory via a path which is independent of a path which couples IOMMU 400 to the one or more processor cores.

Controller 425 facilitates the provisioning of information by IOMMU 400 to indicate to software whether a given page request in a PRQ is to be processed. Such provisioning is in response to monitor 426 detecting that protocol unit 424 has received via IF 402 a response to an invalidation message which protocol unit 424 previously received from system memory (e.g., via IF 401). In one embodiment, such information comprises a "drain marker" (as referred to herein) which is to be generated—e.g., with the illustrative drain marker unit 428 of controller 425—and enqueued to a PRQ as an alternative to the use of a standard stop marker message which an endpoint device traditionally provides. In another embodiment, such information comprises address information (referred to herein as a "snapshot") which is to be generated—e.g., with the illustrative address snapshot unit 427 of controller 425—to identify a memory location which, at a particular time, was configured to function as a last entry (or "tail") of a PRQ. For example, address snapshot unit 427 sends such a snapshot—based on a response to an invalidation wait message—to an address which is identified in said invalidation wait message.

Although some embodiments are not limited in this regard, IOMMU 400 further comprises circuitry (such as the illustrative mode selection unit 440 shown) to determine whether a particular one, or neither, of address snapshot unit 427 or drain marker unit 428 is to be selectively enabled. In various embodiments, such enabling is based on mode selection unit 440 participating in communications to determine whether an endpoint device provides functionality to selectively disable the generation of stop marker messages. Additionally or alternatively, such enabling is based on mode selection unit 440 participating in other communications to determine whether an OS, or other suitable software, supports functionality (such as that described herein) to provide drain marker information or address snapshot information as an alternative to the use of a standard stop marker messaging.

By way of illustration and not limitation, mode selection unit 440 comprises capability information 441 which identifies the availability of address snapshot unit 427 and/or drain marker unit 428 to support an alternative to a conventional use of stop marker messaging. Additionally or alternatively, capability information 441 is to receive—from an endpoint device, a capability register in system memory, or other suitable resource—information which indicates whether an endpoint device and/or an operating system can support or otherwise accommodate such an alternative to the conventional use of stop marker messaging. Based on capability information 441, mode selection unit 440 configures a mode state 442 which (for example) enables one of address snapshot unit 427 or drain marker unit 428—e.g., wherein mode selection unit 440 further signals the endpoint device endpoint device 450 to disable the generation of stop marker message according to the interface standard.

For example, referring now to FIG. 4B, endpoint device 450 comprises a hardware interface IF 451, protocol circuitry 454, and an address translation cache ATC 452 to facilitate address translation functionality. Protocol unit 454 and ATC 452 correspond functionally to protocol circuitry 134 and ATC 132 (respectively) in some embodiments. IF 451 comprises conductive contacts and, in various embodiments, respective transmitters, receivers and/or other circuitry suitable to facilitate direct or indirect communicative coupling of endpoint device 450 to IOMMU 400 (for example).

Although some embodiments are not limited in this regard, endpoint device 450 further comprises circuitry (such as the illustrative mode selection unit 490 shown) to participate in communications to determine whether endpoint device 450 is to disable the generation of stop marker messages which are compatible with an interface standard. By way of illustration and not limitation, mode selection unit 490 comprises capability information 491 which identifies an ability of mode selection unit 490 to selectively disable the provisioning of stop marker messages with protocol unit 454.

In one such embodiment, mode selection unit 490 participates in communications (e.g., with mode selection unit 440) which identify said capability to an IOMMU. Based on such communications, mode selection unit 490 configures a mode state 492 which (for example) prevents protocol unit 454 from sending stop marker messages—e.g., wherein drain marker information or snapshot address information is to be used as an alternative to indicate the completion of a page drain by endpoint device 450.

Figure 5A:
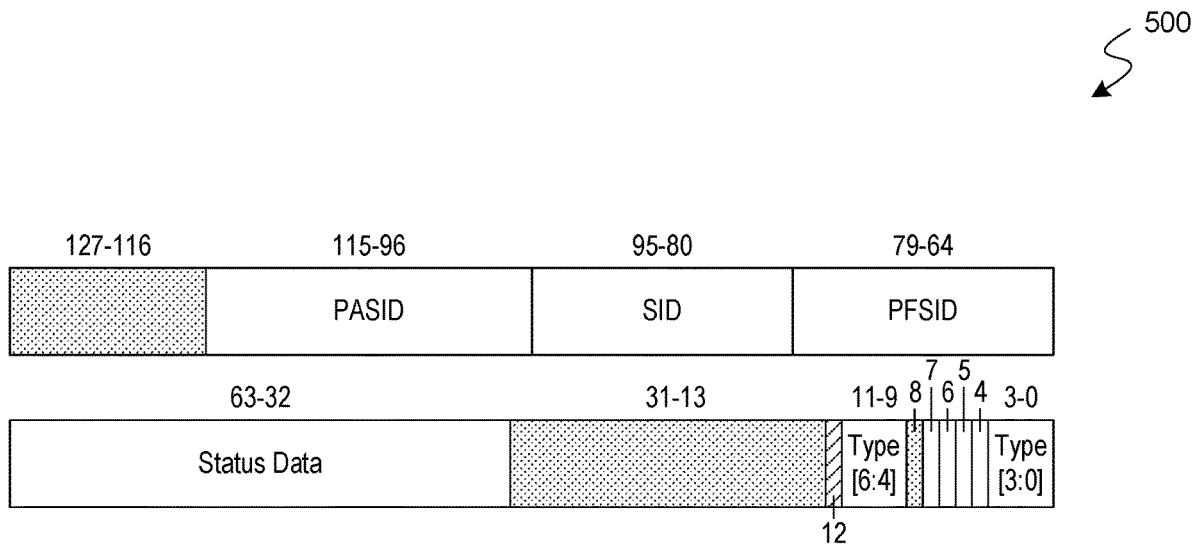
FIGS. 5A, 5B show data layout diagrams each illustrating features of a respective invalidation message to determine whether a page request is to be processed according to a corresponding embodiment.

FIG. 5A shows features of an invalidation wait descriptor 500 which, for example, is sent by a software process to an endpoint device via an IOMMU (and for example, also via an invalidation queue in system memory). Invalidation wait descriptor 500 illustrates a format of an invalidation wait message type which, for example, is adapted from a VT-d specification (in this example embodiment). Invalidation wait descriptor 500 allows software to synchronize with hardware for any pending invalidation request messages which were submitted before invalidation wait descriptor 500.

In the example shown, invalidation wait descriptor 500 is adapted to provide one or more identifiers (such as the illustrative PASID, SID, and PFSID shown) which are associated with a given endpoint device. In one such embodiment, some or all of the one or more identifiers are used by an IOMMU—e.g., as a basis for monitoring to detect for a message in response to invalidation wait descriptor 500 (the message provided by the endpoint device). To facilitate an alternative to the communication of a conventional stop marker message, invalidation wait descriptor 500 comprises a field—such as the illustrative single-bit field at bit [12]—in which software provides a value to indicate to an IOMMU (for example) whether to generate a drain marker based on such a response message. In various embodiments, such a drain marker is to include some or all of the PASID, SID, and PFSID which the IOMMU detects in invalidation wait descriptor 500.

Figure 5B:
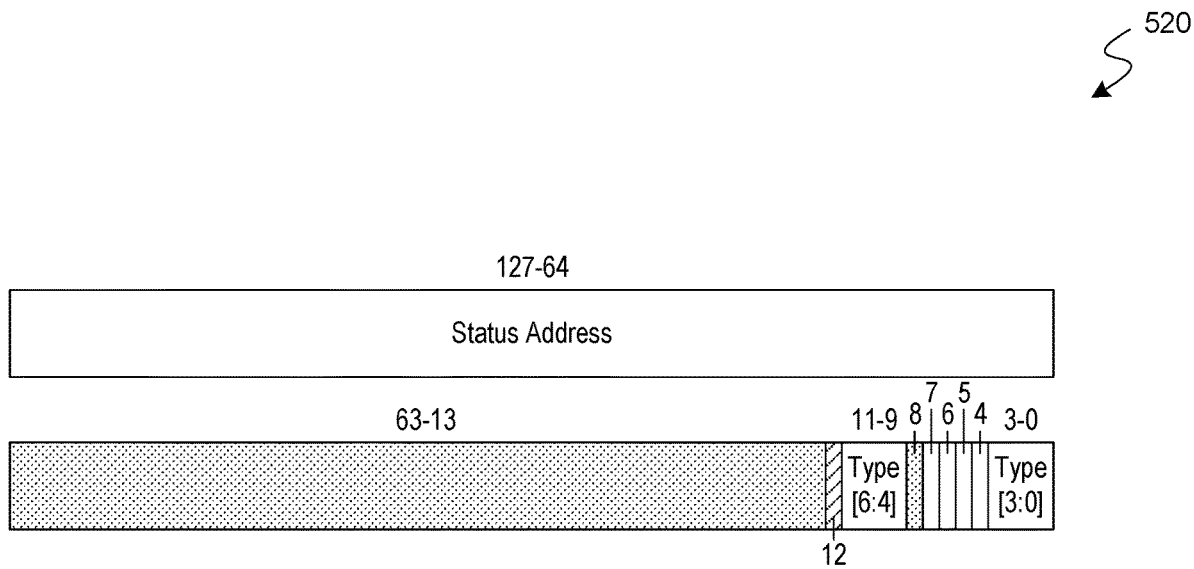

FIG. 5B shows features of another invalidation wait descriptor 520 which a software process sends via an IOMMU to an endpoint device according to an alternative embodiment. Invalidation wait descriptor 520 illustrates another format of an invalidation wait message type which is adapted from a VT-d specification.

In the example shown, invalidation wait descriptor 520 is adapted to provide an address—in the Status Address field shown—of a location in system memory which is to serve as a repository of a "snapshot" address value. At a time when it is determined, said snapshot address identifies a current location of an end (or "tail") of a PRQ. As described elsewhere herein, different memory locations are successively configured to serve as the current tail of a PRQ (i.e., the next PRQ entry where hardware is to write) as page requests, drain markers and/or other information is enqueued to the PRQ. A snapshot address enables software to determine (for example) where the tail of a PRQ was located in system memory when the completion of a page drain was detected.

To facilitate an alternative to the communication of a conventional stop marker message, invalidation wait descriptor 520 comprises a field—such as the illustrative single-bit field at bit [12]—in which software provides a value to indicate to an IOMMU (for example) whether to a snapshot address is to be written to system memory based on a response message which indicates the completion of a page drain.

Figure 5C:
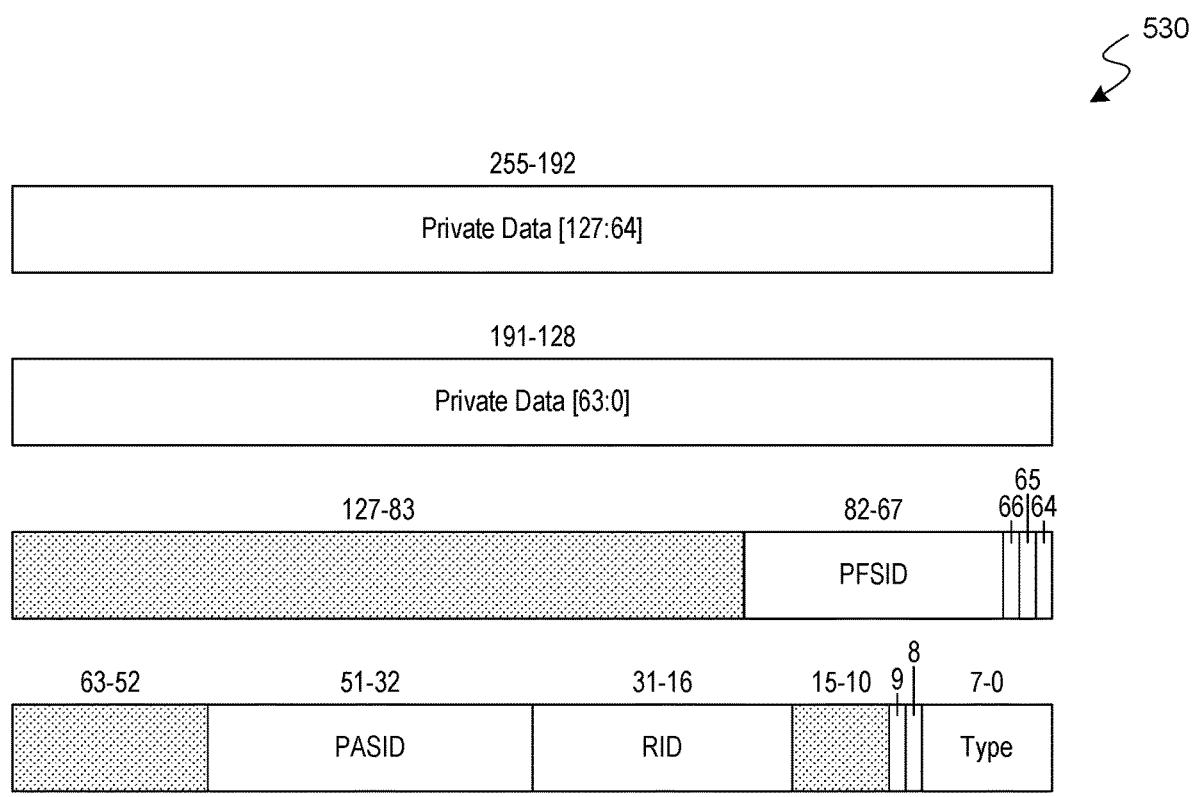
FIG. 5C shows a data layout diagram illustrating features of a drain marker message to be provided to a page requests queue according to a corresponding embodiment.

FIG. 5C shows features of a drain marker message 530 which, for example, is sent by an IOMMU—e.g., based on a response to an invalidation wait message—to be enqueued in a page request queue according to one embodiment. Although some embodiments are not limited in this regard, drain marker message 530 comprises some fields which provide functionality similar to that of corresponding fields in a page request descriptor identified in a VT-d specification. Some examples of various fields in drain marker message 530 are described below.

PASID Present (bit 8): A field to indicate whether a page request is due to a recoverable fault by a request-with-PASID (or by a request-without-PASID).

Drain Complete Present (bit 9): A field which is set to indicate the draining of page requests from an endpoint device has completed.

Type: A field which provides a new type value (e.g., 2 h) to indicate that a previously-submitted invalidation wait message provided a request/hint that the drain marker be inserted to a PRQ.

Requester-ID (RID): A field to identify an endpoint device function which is targeted by a page request group response.

Read Requested (bit 64): A field which is set to 0, to indicate that any request which encountered a recoverable fault (that resulted in this page request), does not require read access to the page.

Write Requested (bit 65): A field which is set to 0 to indicate that any request that encountered the recoverable fault (that resulted in this page request), does not require write access to the page.

Last Page in Group (bit 66): A field which is set to 1 for the drain marker message to be indicative of a last page request to be dropped.

In one such embodiment, the RID value—and, for example, one or both of a PASID value or a PFSID value—which, is copied from the previously-received invalidation wait message into drain marker message 530 by the IOMMU.

Figure 6:
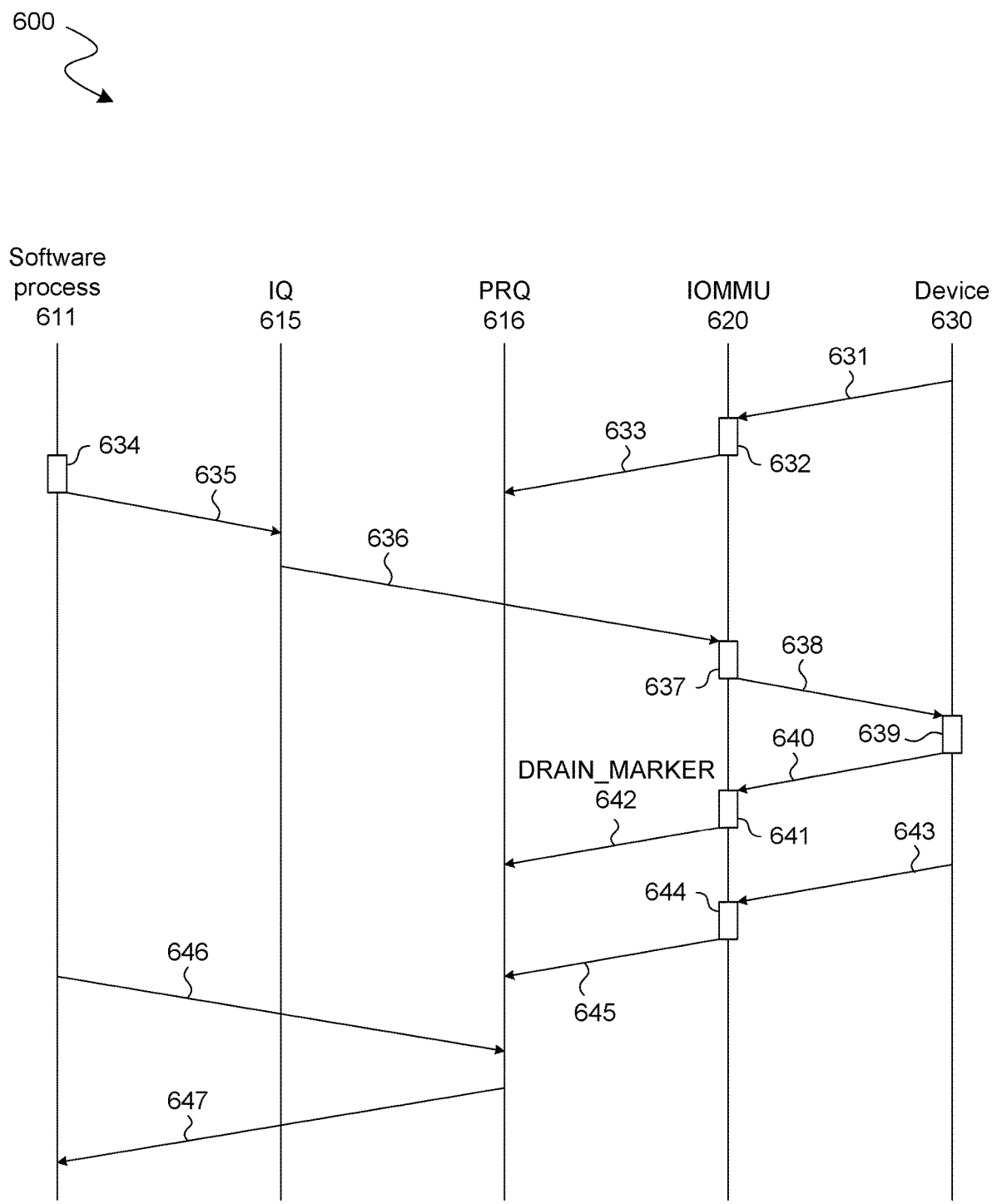
FIGS. 6 and 7 show swim lane diagrams each illustrating features of a respective communication sequence to determine the processing of a page request according to a corresponding embodiment.

FIG. 6 show a sequence 600 of communications to determine the processing of a page request according to an embodiment. Sequence 600 is performed with circuitry which provides functionality of system 100, for example—e.g., wherein one or more messages of sequence 600 include or are otherwise based on information provided by method 200. As shown in FIG. 6, sequence 600 comprises communications—e.g., with a software process 611, an IOMMU 620, and an endpoint device 630—to variously support page requests with an invalidation queue 615, and a page request queue PRQ 616 in a system memory. For example, software process 611, IOMMU 620, device 630, IQ 615, and PRQ 616 correspond functionally to OS 111, IOMMU 120, device 130, IQ 115, and PRQ 116 (respectively).

In an illustrative scenario according to one embodiment, sequence 600 comprises a communication 631, to IOMMU 620, of a first page request which (for example) device 630 sends prior to being reset. After operations 632 by IOMMU 620 to determine that the first page request is to be provided to software process 611, the first page request is sent in a communication 633 for enqueuing to PRQ 616

At some point (for example, while the first page request remains in PRQ 616), software process 611 performs operations 634 which detect, initiate or otherwise determine a reset of device 630. To facilitate operations by software process 611 and the resetting of device 630 (e.g., to promote a synchronization with said operations), an invalidation wait message is provided—with communications 635, 636—from software process 611 to IOMMU 620 via IQ 615. Based on communication 636, IOMMU 620 performs operations 637 to identify the invalidation wait message by type, and to determine that a subsequent response to the invalidation wait message is to result in the enqueuing of a drain marker to PRQ 616. In one such embodiment, IOMMU 620 identifies a PASID, a SID, a PFSID and/or other value in the invalidation wait message, and determines that one or more such values are to be used as a basis for monitoring later messages received by IOMMU 620. Additionally or alternatively, one or more such values are to be included in a drain marker message that IOMMU 620 subsequently generates and sends to PRQ 616.

For example, after IOMMU 620 sends the invalidation wait message in a communication 638, device 630 performs operations 639 to synchronize hardware of device 630 with software process 611. In some embodiments, operations 639 provide, or are otherwise associated with, an assurance that in-flight page requests by device 630 are successfully flushed to IOMMU 620, and then PRQ 616. A completion of operations 639 is indicated by a wait completion message which is sent in a communication 640, from device 630 to IOMMU 620, as a response to the invalidation wait message.

IOMMU 620 then performs operations 641 to identify the wait completion message by type and, based on such identification, to generate a drain marker which indicates completion of a page flush by device 630. In a communication 642, IOMMU 620 sends the drain marker for enqueuing in an entry at the current end (or "tail") of PRQ 616. The drain marker indicates to software process 611 whether a given page request by device 630 is to be processed (or alternatively, to be dropped)—e.g., wherein the first page request, by virtue of being earlier in PRQ 616 than the drain marker, is to be dropped from processing by software process 611.

In one example embodiment, the reset device 630 subsequently sends a second page request to IOMMU 620 in a communication 643, wherein operations 644 by IOMMU 620 identify the second page request by type, and determine that the second page request is to be sent, in a communication 645, for enqueuing at the current tail of PRQ 616. The second page request, by virtue of being later in PRQ 616 than the drain marker, qualifies for processing by software process 611 (and is not to be dropped).

Subsequently, software process 611 participates in various communications (e.g., including the illustrative communications 646, 647 shown) to successively read page requests from PRQ 616 and to determine, based on the position of the drain marker in PRQ 616, whether a given one of the page requests is to be dropped or, alternatively, processed by software process 611.

Figure 7:
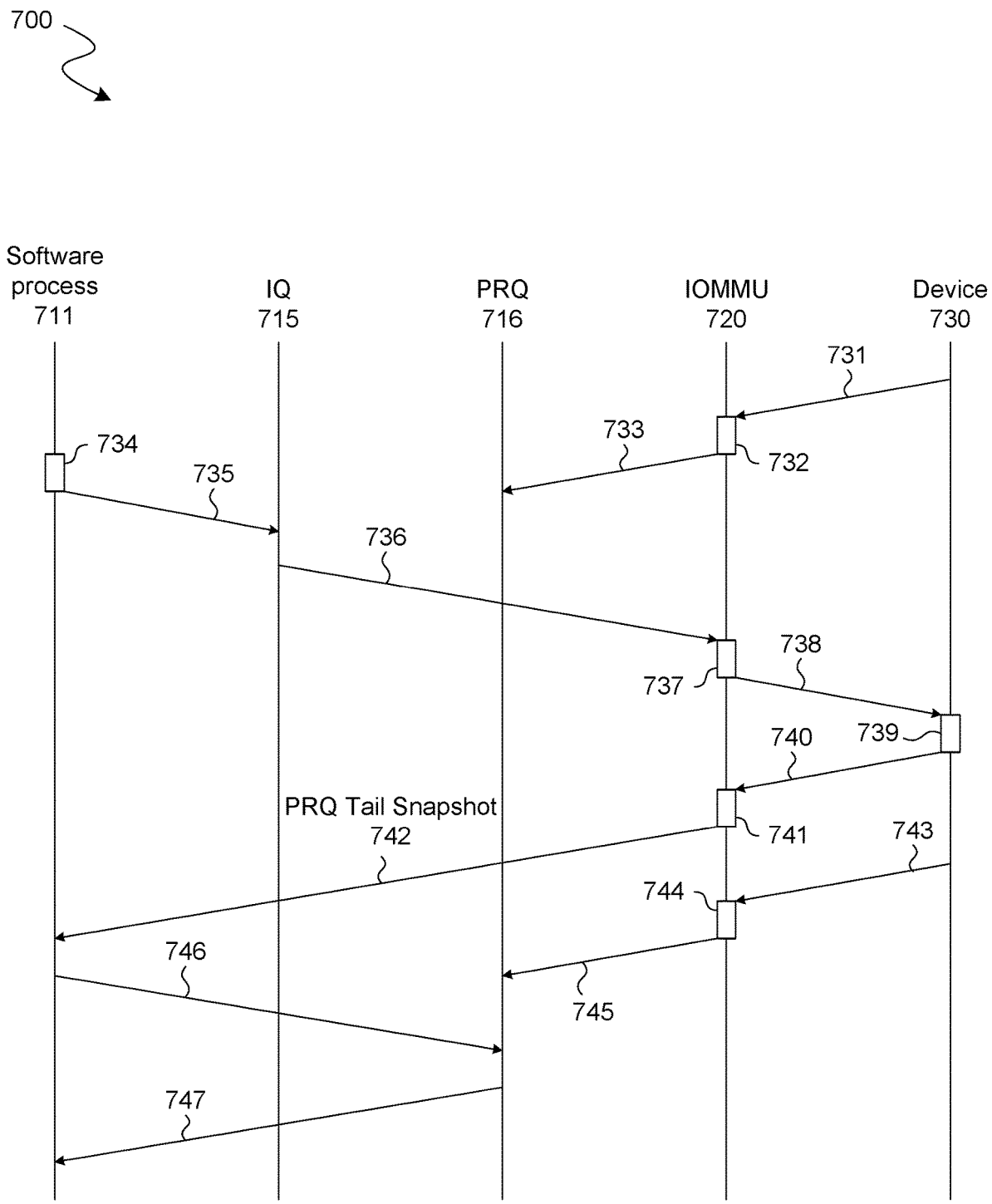

FIG. 7 show a sequence 700 of communications to determine the processing of a page request according to another embodiment. Sequence 700 is performed with circuitry which provides functionality such as that of system 100—e.g., wherein one or more messages of sequence 700 include or are otherwise based on information provided by method 200.

As shown in FIG. 7, sequence 700 comprises communications—e.g., with a software process 711, an IOMMU 720, and an endpoint device 730—to variously access an invalidation queue 715, and a page request queue PRQ 716 in a system memory. For example, software process 711, IOMMU 720, device 730, IQ 715, and PRQ 716 correspond functionally to OS 111, IOMMU 120, device 130, IQ 115, and PRQ 116 (respectively).

In an illustrative scenario according to one embodiment, sequence 700 comprises communications 731, 733, 735, 736, 737, 738, 739, 740, 743, 745, 746, 747 which, for example, correspond functionally to communications 631, 633, 635, 636, 637, 638, 639, 640, 643, 645, 646, 647 (respectively). Furthermore, sequence 700 comprises operations 732, 734, 737, 739, 741, 744 which, for example, correspond functionally to operations 632, 634, 637, 639, 641, 644 (respectively).

In the example embodiment shown, communication 736 comprises an invalidation wait message which includes a pointer, address or other identifier of a location in system memory where IOMMU 720 is to provide another identifier of where a tail entry of PRQ 716 is located. For example, as described elsewhere herein, the provisioning of a PRQ (in some embodiments) comprises successively assigning different locations in system memory to variously function, at different times, each as a next tail entry of the PRQ. The memory location which is to serve as the current tail entry of the PRQ thus changes over time—e.g., as page requests, drain markers, and/or other items are successively enqueued to PRQ 716.

In the example embodiment shown, IOMMU 720 performs operations 741, based on a wait completion message provided in communication 740, to determine a location of a current tail entry of PRQ 716. Based on operations 741, IOMMU 720 sends a communication 742 which includes an address, pointer or other information suitable to represent a "snapshot" of where in system memory the current tail entry of PRQ 716 is located. Although communication 742 is shown as being communicated directly to software process 711, in some embodiments, the PRQ tail snapshot is first written to a memory location which is identified (for example) in the invalidation wait message of communication 736.

With the PRQ tail snapshot provided in communication 742, software process 711 is able to identify that a first page request by device 730 (the first page request provided to PRQ 716 in communication 733) is to be dropped, and that a second page request by device 730 (the second page request provided to PRQ 716 in communication 745) is to be processed.

Figure 8:
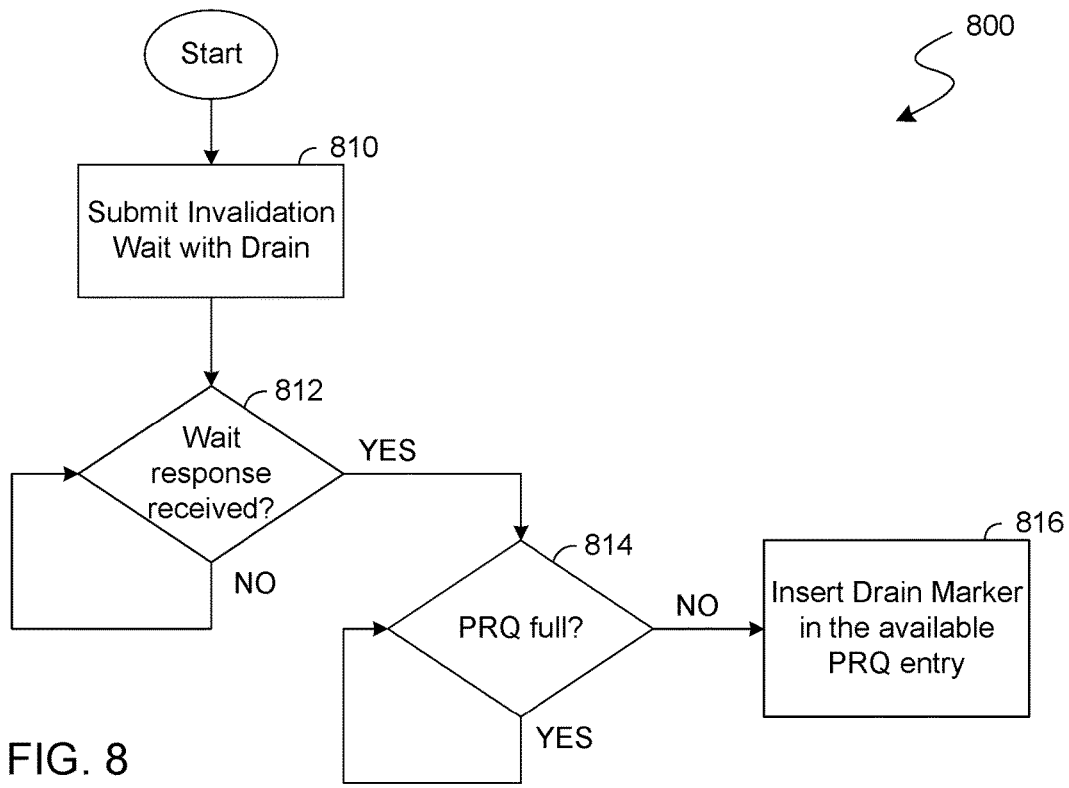
FIGS. 8 and 9 show flow diagrams each illustrating features of a respective method to facilitate the selective processing of a page request according to a corresponding embodiment.

FIG. 8 shows features of a method 800 to indicate whether a page request is to be processed according to an embodiment. Method 800 illustrates one example of an embodiment wherein an IOMMU enqueues, to an entry of a page request queue (PRQ), information which is to indicate—to an operating system, virtual machine, hypervisor, or other such executing process—the completion of a page flush by an endpoint device. For example, the enqueued information is function as an indicator which distinguishes between a region of the PRQ for which any pending page requests by that endpoint device are to be dropped, and another region of the PRQ for which any pending page requests by the endpoint device are to be processed. In various embodiments, method 800 is performed with one of IOMMUs 120, 400, 620, or 730—e.g., wherein method 800 includes operations of method 200.

In various embodiments, remapping hardware of an IOMMU supports a PRQ which is to be operated, as a circular buffer in system memory (e.g., according to a VT-d specification), to record page request messages as they are received. By way of illustration and not limitation, software variously programs registers to provide such a PRQ—e.g., including a PRQ Address Register to identify a base address and size of the PRQ in system memory, a PRQ Head Register to identify a location (referred to herein as a "PRQ head location") of the next entry in the PRQ which software is to consider for processing, and a PRQ Tail Register to identify a location (referred to herein as a "PRQ tail location") of the next entry in the PRQ which is to be written to by an IOMMU or other such hardware. In one such embodiment, the PRQ Head Register is incremented at page requests are consumed (e.g., processed or dropped) by software, and the PRQ Tail Register is incremented as page requests are enqueued to the PRQ. The hardware interprets the PRQ as being empty when the Head and Tail Registers are equal, and interprets the PRQ as being full when the Tail Register is one behind the Head Register.

As shown in FIG. 8, method 800 comprises (at 810) submitting to an endpoint device an invalidation wait message which is received from software (e.g., an OS) by the IOMMU that performs method 800. In some embodiments, the invalidation wait message indicates to the IOMMU that a subsequent response to the invalidation wait message is to result in the generation of a drain marker message that is to be enqueued to a PRQ. In one such embodiment, the invalidation wait message includes features of invalidation wait descriptor 500 (for example).

Method 800 further comprises (at 812) performing an evaluation to determine whether the endpoint device has provided a response to the invalidation wait message. Such evaluating at 812 is repeated, as necessary, until the IOMMU receives a corresponding wait completion message from the endpoint device. In various embodiment, the evaluating at 812 comprises snooping or otherwise detecting whether a given response received by the IOMMU has identifier information—e.g., including a PASID, a SID, a PFSID and/or the like—which was provided in the invalidation wait message. In various embodiments, some or all such identifier information is to be included in a drain marker which the IOMMU subsequently generates.

Where the evaluating at 812 detects a wait response, method 800 (at 814) performs another evaluation to determine whether the PRQ has a next available entry to enqueue a drain marker message. Where it is determined at 812 that the PRQ is full, method 800 performs one or more additional instances of the evaluating at 812 until an available PRQ entry is detected. Upon determining that an entry of the PRQ is available, method 800 (at 816) inserts into the entry a drain marker which is generated at the IOMMU—e.g., wherein such generation and enqueuing is independent of the endpoint device communicating to the IOMMU any message of a standard stop marker message type.

Figure 9:
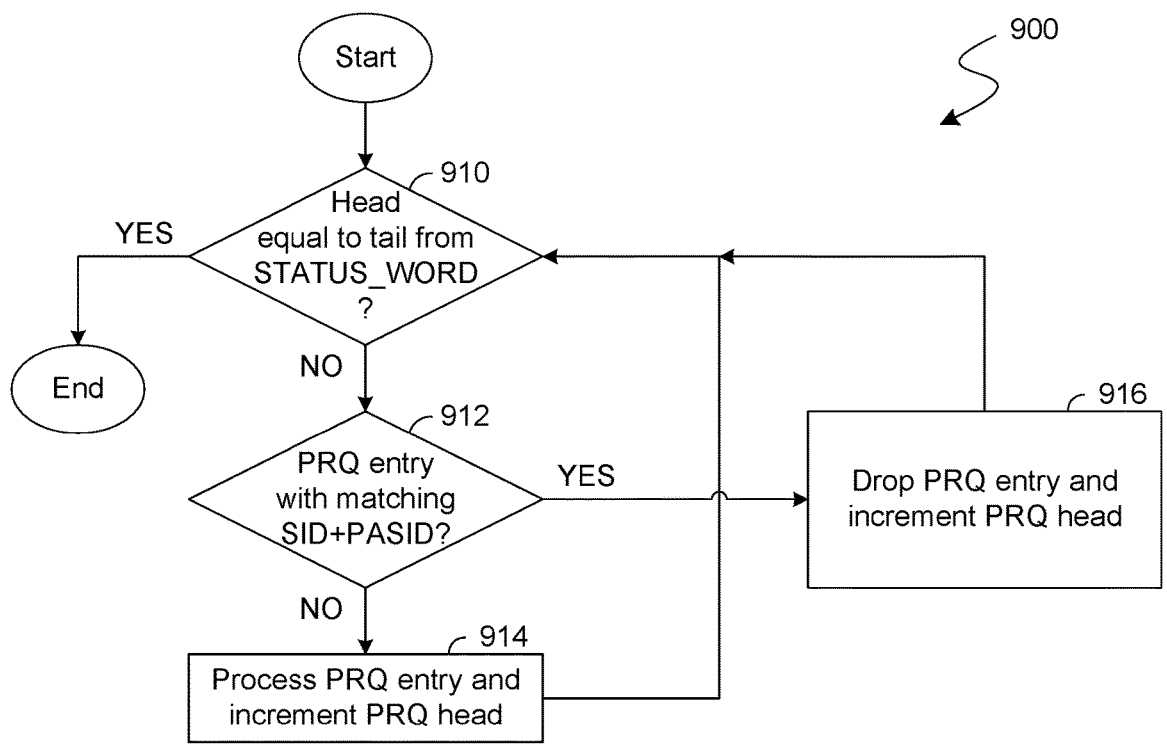

FIG. 9 shows features of a method 900 to selectively process a page request according to an embodiment. The method 900 illustrates one example of an embodiment wherein an operating system, virtual machine, hypervisor, or other suitable process executed with a processor, determines whether a page request from a given endpoint device is to be processed (or alternatively, dropped). In this particular context, "processing" refers to operations directed toward the accessing of a requested page in memory, and is to be distinguished from the dropping of a page request, wherein a decision is made to forego such operations. In various embodiments, method 900 is provided with functionality such as that of OS 111 (or other suitable software)—e.g., wherein method 900 is performed based on information which is provided with an IOMMU according to method 200.

In the example embodiment shown, method 900 is performed after an IOMMU has provided a signal to indicate to software the completion of a page flush by an endpoint device which has been (or is being) reset. For example, based on a response by the endpoint device to an invalidation wait message, the IOMMU writes a snapshot of the current PRQ tail location to a location in memory (the location represented as "STATUS_WORD"). In one such embodiment, software identifies an address of the target STATUS_WORD location to the IOMMU in the invalidation wait message. The snapshotted PRQ tail location is to function as an indicator which distinguishes between a region of the PRQ for which any pending page requests by the device are to be dropped, and another region of the PRQ for which any pending page requests by the device are to be processed.

As shown in FIG. 9, method 900 comprises performing an evaluation (at 910) to determine whether the current PRQ head location is the same as an earlier PRQ tail location, for which the IOMMU previously provided a "snapshot" in a communication sent based on an invalidation wait response message from the endpoint device. Where it is determined at 910 that the previous PRQ tail location is now the current PRQ head location, method 900 ends—i.e., wherein the dropping of earlier page requests from the device has completed, and the software can resume processing PRQ entries without needing to look for page requests to be dropped.

Where it is instead determined at 910 that the previous PRQ tail location has not yet become the current PRQ head location, method 900 performs another evaluation (at 912) to determine whether the current PRQ head location has an entry which represents a page request from the endpoint device which has been reset. In this example embodiment, the evaluation at 912 comprises determining whether the entry at the current PRQ head location includes both a SID and a PASID which match that of the endpoint device.

Where it is determined at 912 that the page request at the current PRQ head location is not from the endpoint device, method 900 (at 914) processes said page request—e.g., wherein the PRQ head location is subsequently incremented—and returns to perform a next instance of the evaluating at 910. Processing of the page request entry includes operations adapted (for example) from conventional memory access techniques, which are not detailed herein, and are not limiting on some embodiments.

Where it is instead determined at 912 that the page request at the current PRQ head location is from the endpoint device, method 900 (at 916) drops said page request—e.g., wherein the PRQ head location is subsequently incremented—and returns to perform a next instance of the evaluating at 910.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1106, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
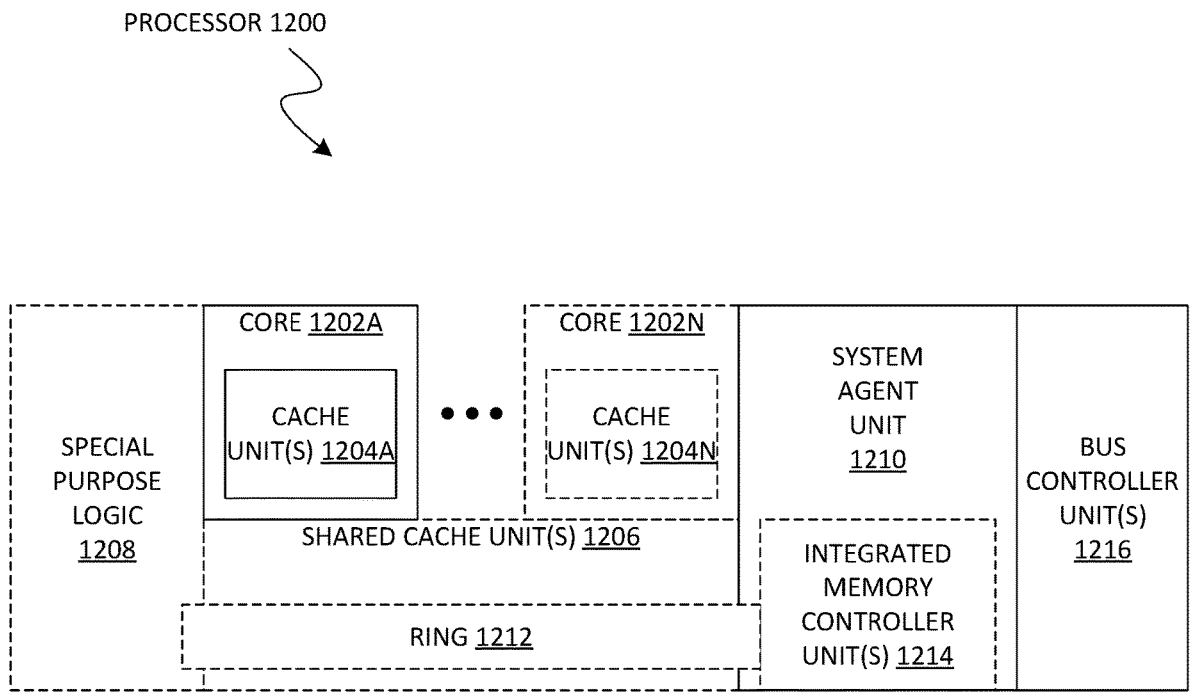
FIG. 12 is a block diagram of a processor that may have more than one core, may have an integrated memory controller, and may have integrated graphics according to an embodiment.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes respective one or more levels of caches 1204A-N within cores 1202A-N, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the special purpose logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the special purpose logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13 through 16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
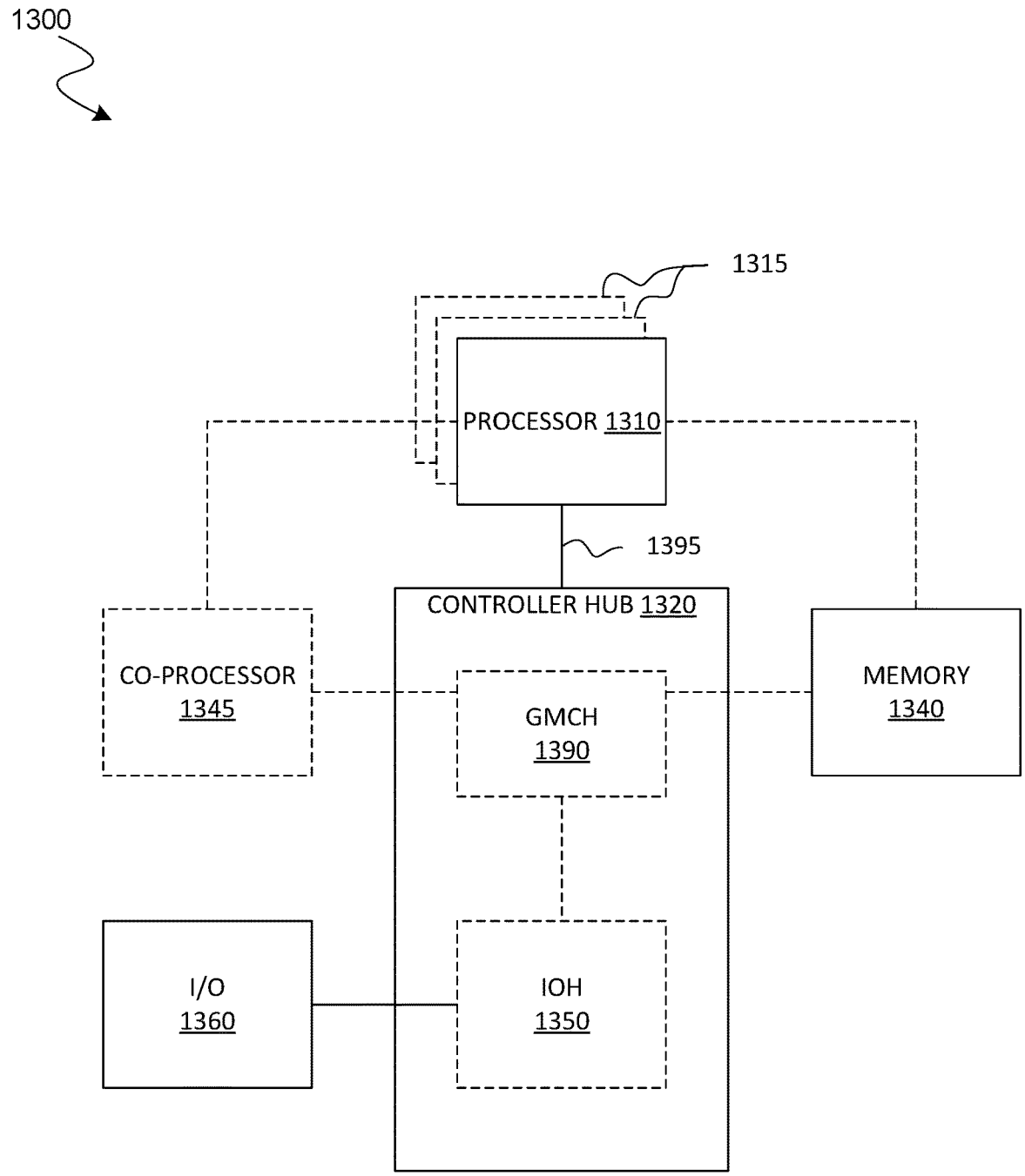
FIGS. 13 through 16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the processors 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
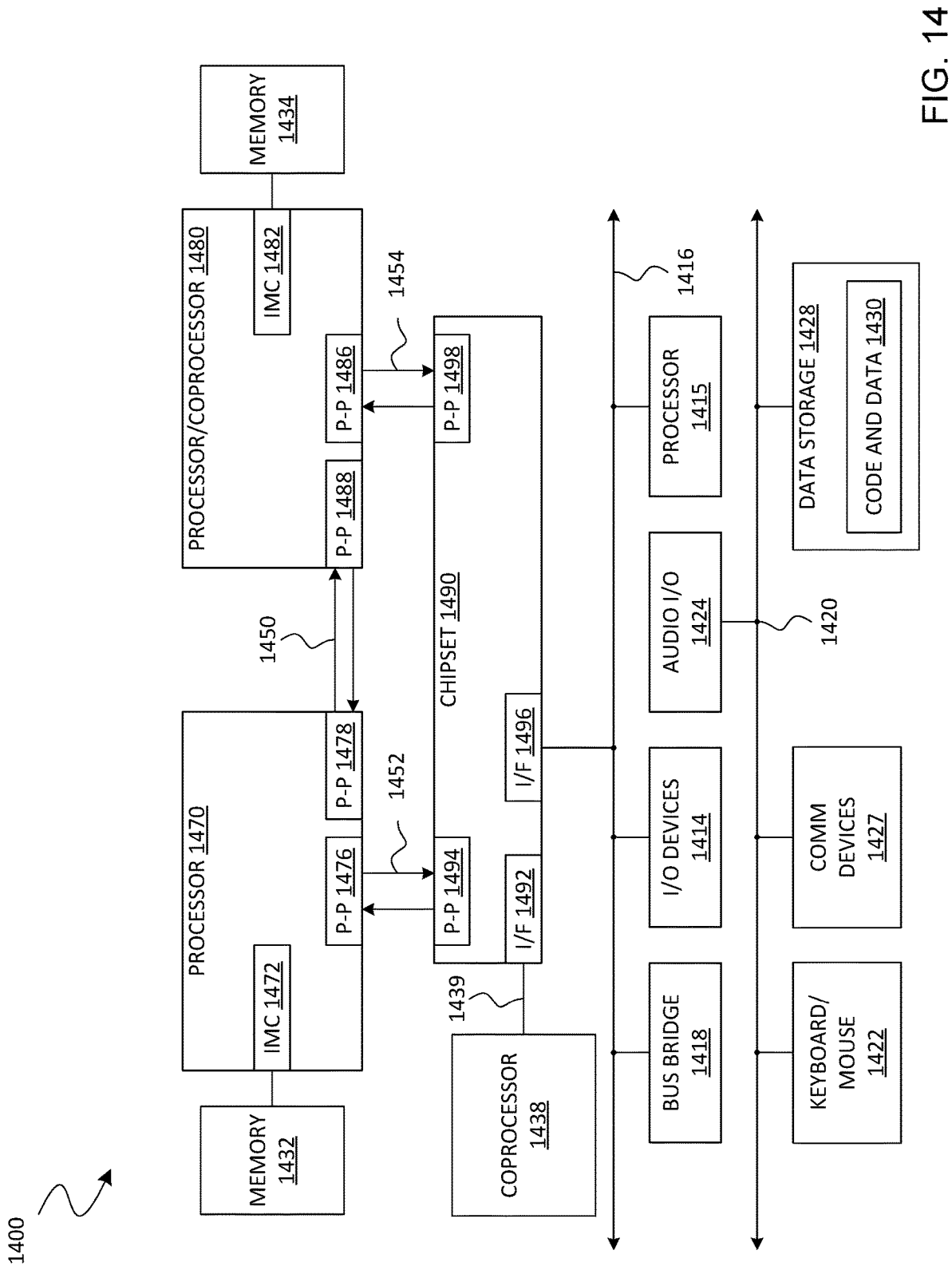

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller unit's point-to-point (P-P) interfaces 1476 and 1478; similarly, second processor 1480 includes P-P interfaces 1486 and 1488. Processors 1470, 1480 may exchange information via a point-to-point (P-P) interconnect 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492 and an interconnect 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
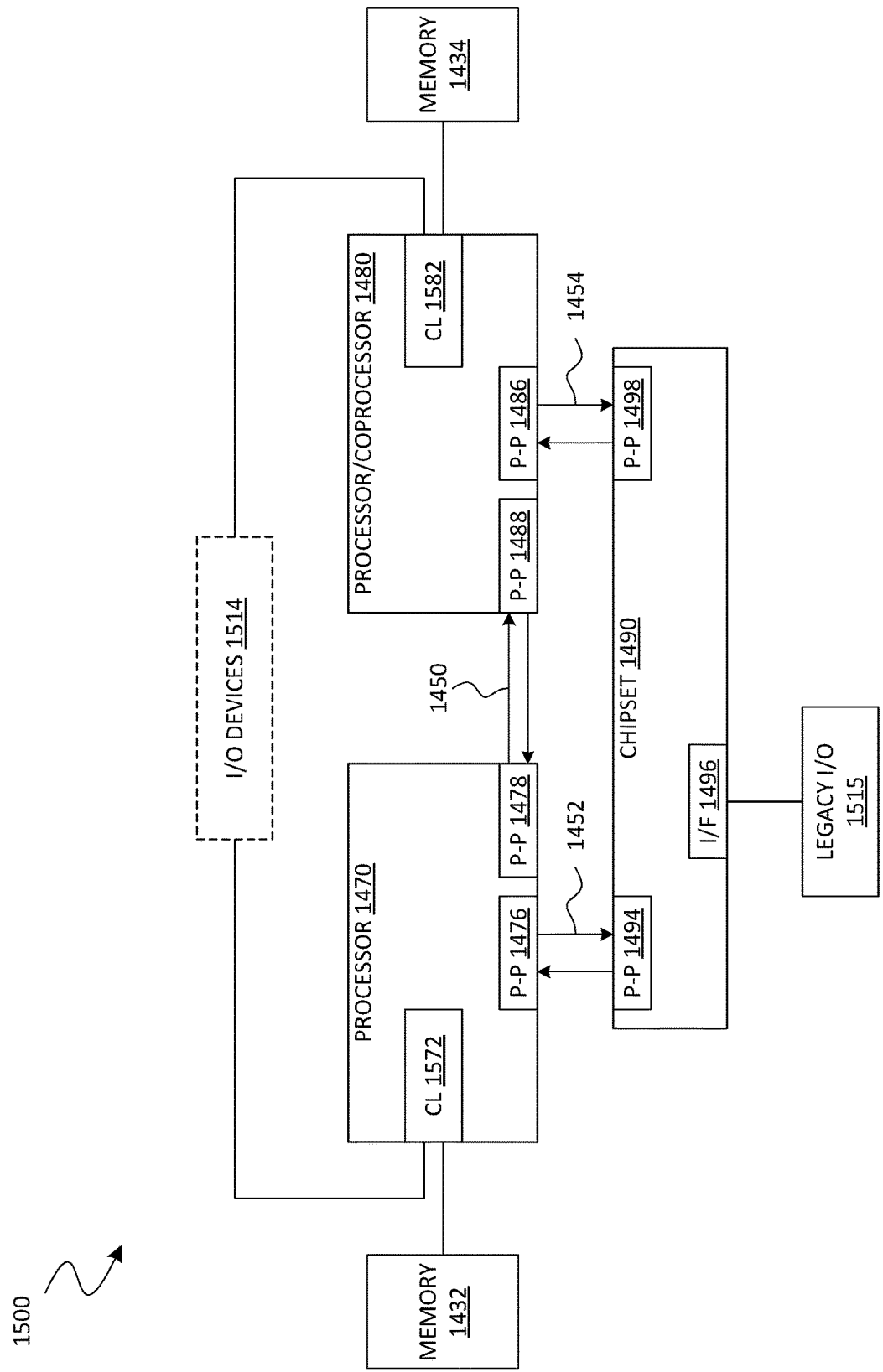

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1572 and 1582, respectively. Thus, the CL 1572, 1582 include integrated memory controller units and include I/O control logic. FIG. 15 illustrates that not only are the memories 1432, 1434 coupled to the CL 1572, 1582, but also that I/O devices 1514 are also coupled to the control logic 1572, 1582. Legacy I/O devices 1515 are coupled to the chipset 1490.

Figure 16:
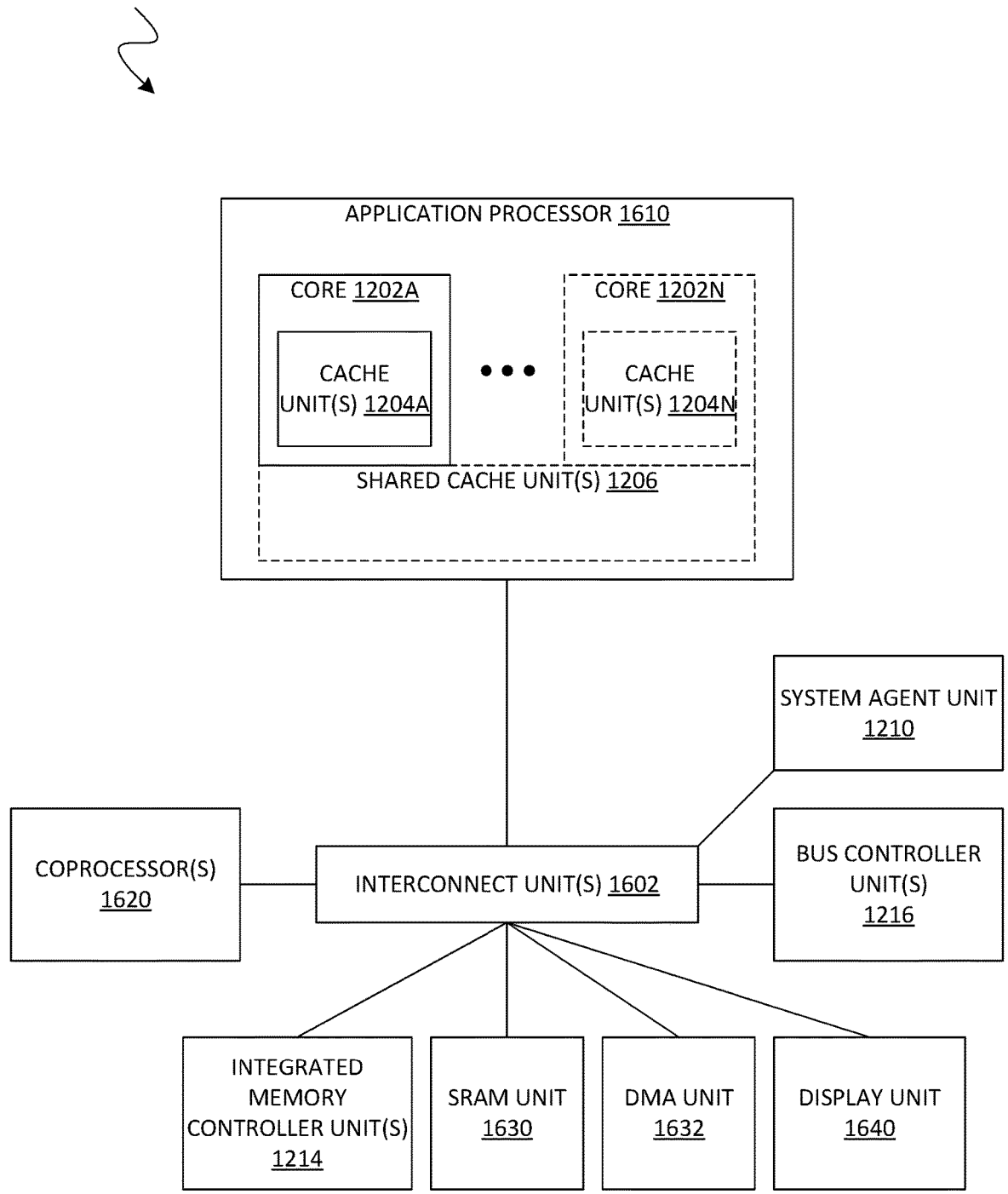

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
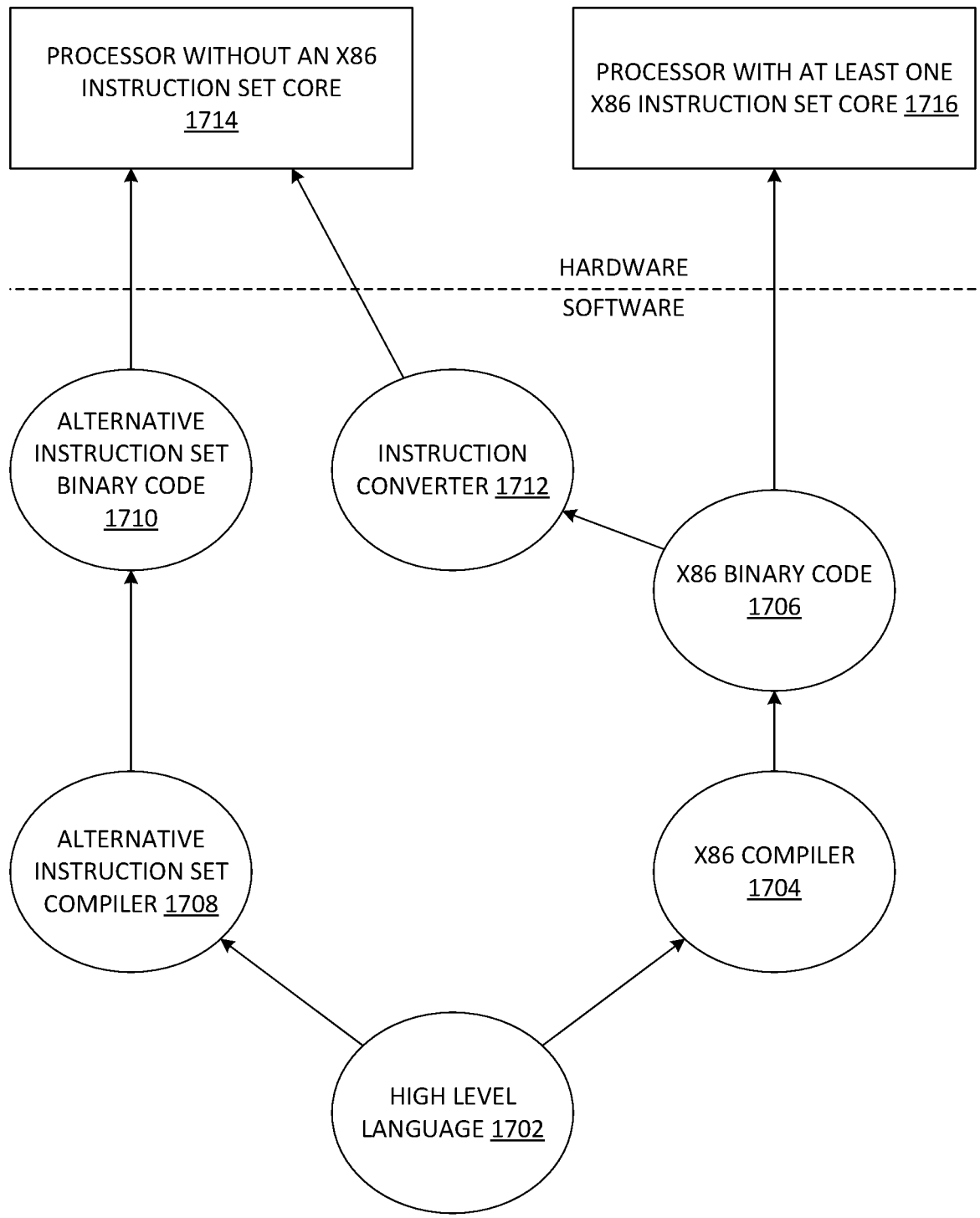
FIG. 17 is a block diagram contrasting the use of a software instruction converter to convert binary instructions in a source instruction set to binary instructions in a target instruction set according to an embodiment.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

In one or more first embodiments, an input/output memory management unit (IOMMU) comprises first circuitry to couple the IOMMU between a core of a processor and a device, second circuitry to provide, to a first queue, a first page request and a second page request each from the device, the first page request and the second page request each compatible with an interface standard which comprises a stop marker message type to indicate a stoppage of page requests, send to the device a wait message from a process which is provided with an execution of instructions by the core, wherein the wait message indicates that an invalidation, specified in a second queue, is to be delayed until after a response to the wait message is detected, and receive from the device the response to the wait message, and third circuitry to send from the IOMMU a communication, based on the response, to indicate to the process that the first page request is to be dropped, and that the second page request is to be processed, wherein the communication is provided independent of any communication, by the device, of a message which is of the stop marker message type.

In one or more second embodiments, further to the first embodiment, the first page request is to be provided to a first entry of the first queue, the second page request is to be provided to a second entry of the first queue, and the communication is to provide information to a third entry of the first queue, the third entry between the first entry and the second entry, wherein the information is to indicate to the process that a first region of the first queue corresponds to page requests which are to be dropped, wherein the first region comprises the first entry, and a second region of the first queue corresponds to page requests which are to be processed, wherein the second region comprises the second entry.

In one or more third embodiments, further to the second embodiment, the wait message comprises an identifier which corresponds to the device, wherein the third circuitry is further to determine the information based on the wait message, wherein the information comprises the identifier which corresponds to the device.

In one or more fourth embodiments, further to the third embodiment, the identifier which corresponds to the device comprises one or more of a process address space identifier, a physical function source identifier, or a source identifier.

In one or more fifth embodiments, further to the first embodiment or the second embodiment, based on the response, the third circuitry is further to identify a first entry of the first queue as a current tail of the first queue, and the communication comprises an identifier of the first entry.

In one or more sixth embodiments, further to the fifth embodiment, the wait message comprises an address of a memory location, and based on the wait message, the communication is to store the identifier of the first entry to the memory location.

In one or more seventh embodiments, further to the first embodiment or the second embodiment, the interface standard is compatible with a Peripheral Component Interconnect Express specification.

In one or more eighth embodiments, further to the first embodiment or the second embodiment, the wait message is compatible with a wait message type of a virtualization standard.

In one or more ninth embodiments, further to the first embodiment or the second embodiment, the third circuitry is further to participate in a first communication to determine that the process provides a first functionality to drop the first page request based on the communication, and set an operational mode of the IOMMU based on the first communication, wherein the IOMMU is to provide the communication further based on the operational mode.

In one or more tenth embodiments, further to the first embodiment or the second embodiment, the third circuitry is further to participate in a second communication with the device to determine that the device provides a second functionality to disable a generation of messages of the stop marker message type, and based on the second communication signal the device to disable the generation of messages of the stop marker message type, and set an operational mode of the IOMMU based on the second communication, wherein the IOMMU is to provide the communication further based on the operational mode.

In one or more eleventh embodiments, a method by an input/output memory management unit (IOMMU) comprises providing, to a first queue, a first page request and a second page request each from a device, wherein the IOMMU is coupled between a core of a processor and the device, the first page request and the second page request each compatible with an interface standard which comprises a stop marker message type to indicate a stoppage of page requests, sending to the device a wait message from a process which is provided with an execution of instructions by the core, wherein the wait message indicates that an invalidation, specified in a second queue, is to be delayed until after a response to the wait message is detected, receiving from the device the response to the wait message, and based on the response, sending from the IOMMU a communication to indicate to the process that the first page request is to be dropped, and that the second page request is to be processed, wherein the communication is sent independent of any communication, by the device, of a message which is of the stop marker message type.

In one or more twelfth embodiments, further to the eleventh embodiment, the first page request is to be provided to a first entry of the first queue, the second page request is to be provided to a second entry of the first queue, and the communication is to provide information to a third entry of the first queue, the third entry between the first entry and the second entry, wherein the information is to indicate to the process that a first region of the first queue corresponds to page requests which are to be dropped, wherein the first region comprises the first entry, and a second region of the first queue corresponds to page requests which are to be processed, wherein the second region comprises the second entry.

In one or more thirteenth embodiments, further to the twelfth embodiment, the wait message comprises an identifier which corresponds to the device, the method further comprises determining the information based on the wait message, wherein the information comprises the identifier which corresponds to the device.

In one or more fourteenth embodiments, further to the thirteenth embodiment, the identifier which corresponds to the device comprises one or more of a process address space identifier, a physical function source identifier, or a source identifier.

In one or more fifteenth embodiments, further to the eleventh embodiment or the twelfth embodiment, the method further comprises, based on the response, identifying a first entry of the first queue as a current tail of the first queue, wherein the communication comprises an identifier of the first entry.

In one or more sixteenth embodiments, further to the fifteenth embodiment, the wait message comprises an address of a memory location, and based on the wait message, the communication is to store the identifier of the first entry to the memory location.

In one or more seventeenth embodiments, further to the eleventh embodiment or the twelfth embodiment, the interface standard is compatible with a Peripheral Component Interconnect Express specification.

In one or more eighteenth embodiments, further to the eleventh embodiment or the twelfth embodiment, the wait message is compatible with a wait message type of a virtualization standard.

In one or more nineteenth embodiments, further to the eleventh embodiment or the twelfth embodiment, the method further comprises, participating in a first communication to determine that the process provides a first functionality to drop the first page request based on the communication, and setting an operational mode of the IOMMU based on the first communication, wherein the IOMMU is to send the communication further based on the operational mode.

In one or more twentieth embodiments, further to the eleventh embodiment or the twelfth embodiment, the method further comprises participating in a second communication with the device to determine that the device provides a second functionality to disable a generation of messages of the stop marker message type, and based on the second communication, signaling the device to disable the generation of messages of the stop marker message type, and setting an operational mode of the IOMMU based on the second communication, wherein the IOMMU is to send the communication further based on the operational mode.

In one or more twenty-first embodiments, a device comprises first circuitry to couple the device to a core of a processor via an input/output memory management unit (IOMMU), second circuitry to participate in a first communication to indicate to the IOMMU a first mode of the device, wherein the first mode is to disable a functionality of the device to generate messages of a stop marker message type, and third circuitry which, during the first mode, is to send to the IOMMU a first page request and a second page request which are each compatible with an interface standard which comprises the stop marker message type, receive via the IOMMU a wait message from a process which is provided with an execution of instructions by the core, wherein the wait message indicates that an invalidation is to be delayed until after a response to the wait message is detected, and send to the IOMMU a response to the wait message, wherein, based on the response, the IOMMU is to send a second communication to indicate to the process that the first page request is to be dropped, and that the second page request is to be processed.

In one or more twenty-second embodiments, further to the twenty-first embodiment, the interface standard is compatible with a Peripheral Component Interconnect Express specification.

In one or more twenty-third embodiments, further to the twenty-first embodiment or the twenty-second embodiment, the wait message is compatible with a wait message type of a virtualization standard.

In one or more twenty-fourth embodiments, a method at an endpoint device comprises participating in a first communication while the endpoint device is coupled to a core of a processor via an input/output memory management unit (IOMMU), wherein the first communication indicates to the IOMMU a first mode of the endpoint device, wherein the first mode disables a functionality of the endpoint device to generate messages of a stop marker message type, and during the first mode of the device sending to the IOMMU a first page request and a second page request which are each compatible with an interface standard which comprises the stop marker message type, receiving via the IOMMU a wait message from a process which is provided with an execution of instructions by the core, wherein the wait message indicates that an invalidation is to be delayed until after a response to the wait message is detected, and sending to the IOMMU a response to the wait message, wherein, based on the response, the IOMMU sends a second communication to indicate to the process that the first page request is to be dropped, and that the second page request is to be processed.

In one or more twenty-fifth embodiments, further to the twenty-fourth embodiment, the interface standard is compatible with a Peripheral Component Interconnect Express specification.

In one or more twenty-sixth embodiments, further to the twenty-fourth embodiment or the twenty-fifth embodiment, the wait message is compatible with a wait message type of a virtualization standard.

Techniques and architectures for determining whether a page request is to be processed are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An input/output memory management unit (IOMMU) comprising:
   first circuitry to couple the IOMMU between a core of a processor and a device;
   second circuitry to:
   provide, to a first queue, a first page request and a second page request each from the device, the first page request and the second page request each compatible with an interface standard which comprises a stop marker message type to indicate a stoppage of page requests;
   send to the device a wait message from a process which is provided with an execution of instructions by the core, wherein the wait message indicates that an invalidation, specified in a second queue, is to be delayed until after a response to the wait message is detected; and
   receive from the device the response to the wait message; and
   third circuitry to send from the IOMMU a communication, based on the response, to indicate to the process that the first page request is to be dropped, and that the second page request is to be processed, wherein the communication is provided independent of any communication, by the device, of a message which is of the stop marker message type.

2. The IOMMU of claim 1, wherein:
   the first page request is to be provided to a first entry of the first queue;
   the second page request is to be provided to a second entry of the first queue; and
   the communication is to provide information to a third entry of the first queue, the third entry between the first entry and the second entry, wherein the information is to indicate to the process that:
   a first region of the first queue corresponds to page requests which are to be dropped, wherein the first region comprises the first entry; and
   a second region of the first queue corresponds to page requests which are to be processed, wherein the second region comprises the second entry.

3. The IOMMU of claim 2, wherein the wait message comprises an identifier which corresponds to the device, wherein the third circuitry is further to determine the information based on the wait message, wherein the information comprises the identifier which corresponds to the device.

4. The IOMMU of claim 3, wherein the identifier which corresponds to the device comprises one or more of a process address space identifier, a physical function source identifier, or a source identifier.

5. The IOMMU of claim 1, wherein:
   based on the response, the third circuitry is further to identify a first entry of the first queue as a current tail of the first queue; and
   the communication comprises an identifier of the first entry.

6. The IOMMU of claim 5, wherein:
   the wait message comprises an address of a memory location; and
   based on the wait message, the communication is to store the identifier of the first entry to the memory location.

7. The IOMMU of claim 1, wherein the interface standard is compatible with a Peripheral Component Interconnect Express specification.

8. The IOMMU of claim 1, wherein the wait message is compatible with a wait message type of a virtualization standard.

9. The IOMMU of claim 1, wherein the third circuitry is further to:
   participate in a first communication to determine that the process provides a first functionality to drop the first page request based on the communication; and
   set an operational mode of the IOMMU based on the first communication, wherein the IOMMU is to provide the communication further based on the operational mode.

10. The IOMMU of claim 1, wherein the third circuitry is further to:
participate in a second communication with the device to determine that the device provides a second functionality to disable a generation of messages of the stop marker message type; and
based on the second communication:
signal the device to disable the generation of messages of the stop marker message type; and
set an operational mode of the IOMMU based on the second communication, wherein the IOMMU is to provide the communication further based on the operational mode.

11. A method by an input/output memory management unit (IOMMU), the method comprising:
providing, to a first queue, a first page request and a second page request each from a device, wherein the IOMMU is coupled between a core of a processor and the device, the first page request and the second page request each compatible with an interface standard which comprises a stop marker message type to indicate a stoppage of page requests;
sending to the device a wait message from a process which is provided with an execution of instructions by the core, wherein the wait message indicates that an invalidation, specified in a second queue, is to be delayed until after a response to the wait message is detected;
receiving from the device the response to the wait message; and
based on the response, sending from the IOMMU a communication to indicate to the process that the first page request is to be dropped, and that the second page request is to be processed, wherein the communication is sent independent of any communication, by the device, of a message which is of the stop marker message type.

12. The method of claim 11, wherein:
the first page request is to be provided to a first entry of the first queue;
the second page request is to be provided to a second entry of the first queue; and
the communication is to provide information to a third entry of the first queue, the third entry between the first entry and the second entry, wherein the information is to indicate to the process that:
a first region of the first queue corresponds to page requests which are to be dropped, wherein the first region comprises the first entry; and
a second region of the first queue corresponds to page requests which are to be processed, wherein the second region comprises the second entry.

13. The method of claim 11, further comprising:
based on the response, identifying a first entry of the first queue as a current tail of the first queue;
wherein the communication comprises an identifier of the first entry.

14. The method of claim 13, wherein:
the wait message comprises an address of a memory location; and
based on the wait message, the communication is to store the identifier of the first entry to the memory location.

15. The method of claim 11, wherein the interface standard is compatible with a Peripheral Component Interconnect Express specification.

16. The method of claim 11, wherein the wait message is compatible with a wait message type of a virtualization standard.

17. The method of claim 11, further comprising:
participating in a second communication with the device to determine that the device provides a second functionality to disable a generation of messages of the stop marker message type; and
based on the second communication:
signaling the device to disable the generation of messages of the stop marker message type; and
setting an operational mode of the IOMMU based on the second communication, wherein the IOMMU is to send the communication further based on the operational mode.

18. A device comprising:
first circuitry to couple the device to a core of a processor via an input/output memory management unit (IOMMU);
second circuitry to participate in a first communication to indicate to the IOMMU a first mode of the device, wherein the first mode is to disable a functionality of the device to generate messages of a stop marker message type; and
third circuitry which, during the first mode, is to:
send to the IOMMU a first page request and a second page request which are each compatible with an interface standard which comprises the stop marker message type;
receive via the IOMMU a wait message from a process which is provided with an execution of instructions by the core, wherein the wait message indicates that an invalidation is to be delayed until after a response to the wait message is detected; and
send to the IOMMU a response to the wait message, wherein, based on the response, the IOMMU is to send a second communication to indicate to the process that the first page request is to be dropped, and that the second page request is to be processed.

19. The device of claim 18, wherein the interface standard is compatible with a Peripheral Component Interconnect Express specification.

20. The device of claim 18, wherein the wait message is compatible with a wait message type of a virtualization standard.

* * * * *